United States Patent
Nakajima et al.

(10) Patent No.: US 9,565,388 B2
(45) Date of Patent: Feb. 7, 2017

(54) VIDEO DISPLAY DEVICE

(71) Applicant: HITACHI MAXELL, LTD., Ibaraki-shi, Osaka (JP)

(72) Inventors: Mitsuo Nakajima, Tokyo (JP); Nobuhiro Fukuda, Tokyo (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 14/781,050

(22) PCT Filed: Apr. 3, 2013

(86) PCT No.: PCT/JP2013/060149
§ 371 (c)(1),
(2) Date: Dec. 21, 2015

(87) PCT Pub. No.: WO2014/162533
PCT Pub. Date: Oct. 9, 2014

(65) Prior Publication Data
US 2016/0100122 A1 Apr. 7, 2016

(51) Int. Cl.
*H04N 5/58* (2006.01)
*H04N 9/73* (2006.01)
(Continued)

(52) U.S. Cl.
CPC ............... *H04N 5/58* (2013.01); *G06T 5/007* (2013.01); *G06T 5/008* (2013.01);
(Continued)

(58) Field of Classification Search
CPC .......... H04N 9/3182; H04N 9/68; H04N 9/73; H04N 2005/44517; H04N 5/265; H04N 5/44543; H04N 5/44513; H04N 5/58; G06T 5/008; G06T 5/20; G06T 2207/10024; G06T 2207/20221; G06T 3/40
(Continued)

(56) References Cited

U.S. PATENT DOCUMENTS 6,788,822 B1 9/2004 Zhang et al.
8,149,299 B2 4/2012 Ohwaki et al.
(Continued)

FOREIGN PATENT DOCUMENTS

JP 2005-004506 A 1/2005
JP 2008-244591 A 10/2008
(Continued)

OTHER PUBLICATIONS

International Search Report of PCT/JP2013/060149.
(Continued)

*Primary Examiner* — Sherrie Hsia
(74) *Attorney, Agent, or Firm* — Mattingly & Malur, PC

(57) ABSTRACT

A more favorably visibility-improved video is obtained. A device includes: a video input unit; a first Retinex processing unit which performs a first Retinex process on a video inputted from the video input unit; a second Retinex processing unit which performs a second Retinex process, which is different from the first Retinex process in a method, on the video inputted from the video input unit; a video composing unit which can compose a video processed by the first Retinex processing unit and a video processed by the second Retinex processing unit in accordance with a feature of the video inputted from the video input unit; and a display unit which can display an output video of the video composing unit.

24 Claims, 13 Drawing Sheets

(51) Int. Cl.
*H04N 5/445* (2011.01)
*G06T 5/00* (2006.01)

(52) U.S. Cl.
CPC ..... *H04N 5/44513* (2013.01); *H04N 5/44543* (2013.01); *H04N 9/73* (2013.01); *G06T 2207/10024* (2013.01); *H04N 2005/44517* (2013.01)

(58) Field of Classification Search
USPC ....... 348/744, 571, 687, 598, 599, 602, 603, 348/739, 569; 382/254, 274; 345/629, 345/634, 639, 660
IPC .................................. H04N 5/58,9/73, 5/445
See application file for complete search history.

(56) References Cited

U.S. PATENT DOCUMENTS

| | | | |
|---|---|---|---|
| 8,823,876 B2 | 9/2014 | Fukuda et al. | |
| 8,831,372 B2 | 9/2014 | Akiyama | |
| 2004/0091164 A1* | 5/2004 | Sakatani et al. | G06T 5/20 382/254 |
| 2015/0281663 A1* | 10/2015 | Fukuda et al. | G06T 5/003 348/571 |

FOREIGN PATENT DOCUMENTS

| | | |
|---|---|---|
| JP | 2011-086976 A | 4/2011 |
| JP | 2012-085182 A | 4/2012 |
| JP | 2013-029699 A | 2/2013 |
| JP | 2013-047935 A | 3/2013 |
| WO | 2009/120830 A1 | 10/2009 |

OTHER PUBLICATIONS

Japanese Office Action received in corresponding Japanese Application No. 2015-509785 dated Aug. 9, 2016.
Nozato, Y. et al., "Comparison of Retinex Models for Hardware Implementation" The Institute of Electronics Information and Communication Engineers, IEICE Technical Report, pp. 19-24, Japan.
Extended European Search Report received in corresponding European Application No. 13880992.6 dated Nov. 4, 2016.
Jang, J. H. et al., "Contrast-Enhanced Fusion of Multisensor Images Using Subband-Decomposed Multiscale Retinex", IEEE Transactions on Image Processing, Aug. 2012, pp. 3479-3490, vol. 21, No. 8, New Jersey.

\* cited by examiner

VIDEO DISPLAY DEVICE

TECHNICAL FIELD

The present invention relates to a video processing technique.

BACKGROUND ART

As a background technique of the present technical field, Patent Document 1 is cited. In the publication, in a Multi Scale Retinex process, a composite blur image is created by selecting any one of a plurality of blur images which are generated from a plurality of peripheral functions different scales and which are different in a degree of the blur for each pixel in accordance with a pixel value level of an original image to be a processing target. It is described that the composite blur image is subjected to low pass filter, so that the Retinex process is performed while occurrence of unnatural discontinuation in a boundary is prevented (see Abstract).

PRIOR ART DOCUMENT

Patent Document

Patent Document 1: Japanese Patent Application Laid-Open Publication No. 2005-004506

SUMMARY OF THE INVENTION

Problems to be Solved by the Invention

As a parameter indicating a property of an object captured in video signals, there are various parameters such as a luminance, a color, and a frequency component, and these values are different from each other when video scenes are different from each other. In order to display the video with a good visibility, it is required to correct the video by changing a property such as a contrast correction of the video in accordance with a feature of the video.

However, in such a technique of adjusting a plurality of scales and achieving high performance of a dynamic range compression in an MSR as disclosed in Patent Document 1, contribution of the video to the plurality of scales is considered while the feature of the object is not considered. Therefore, the correction is uniformly performed regardless of the feature of the object in the video.

In addition, in such a technique of adjusting a plurality of scales and achieving high performance of a dynamic range compression in an MSR as disclosed in Patent Document 1, the contribution of the video to the plurality of scales is considered while a contribution of the video to difference in a reflection property is not considered.

Means for Solving the Problems

In order to solve the problem described above, an aspect of the present invention may be configured so as to be provided with, for example, a video input unit, a first Retinex processing unit that performs a first Retinex process on a video inputted from the video input unit, and a second Retinex processing unit that performs a second Retinex process different in a method from the first Retinex process on the video inputted from the video input unit, and so as to be provided with a video composing unit that can compose a video processed by the first Retinex processing unit and a video processed by the second Retinex processing unit in accordance with a feature of the video inputted from the video input unit, and a display unit that can display an output video of the video composing unit.

Effects of the Invention

According to the present invention, a video having more appropriately improved visibility can be obtained.

BEST MODE FOR CARRYING OUT THE INVENTION

Hereinafter, embodiments of the present invention will be described based on the accompanying drawings. However, the present invention is not always limited to these embodiments. Note that the same components are denoted by the same reference symbols throughout each drawing for describing the embodiments, and the repetitive description thereof will be omitted.

First Embodiment

In the present embodiment, a video display device which corrects a video by video decomposition for each light reflection property will be described by using a configuration of a projector. Note that the following will be explanation in a case of a front projector. However, a rear projection television may be applied as another example. In addition, without performing a magnification projection of a panel, a display device using a direct-vision flat display such as a liquid crystal display, a plasma display, or an organic EL display may be applied. This viewpoint is also the same in any of the following embodiments.

Figure 1:
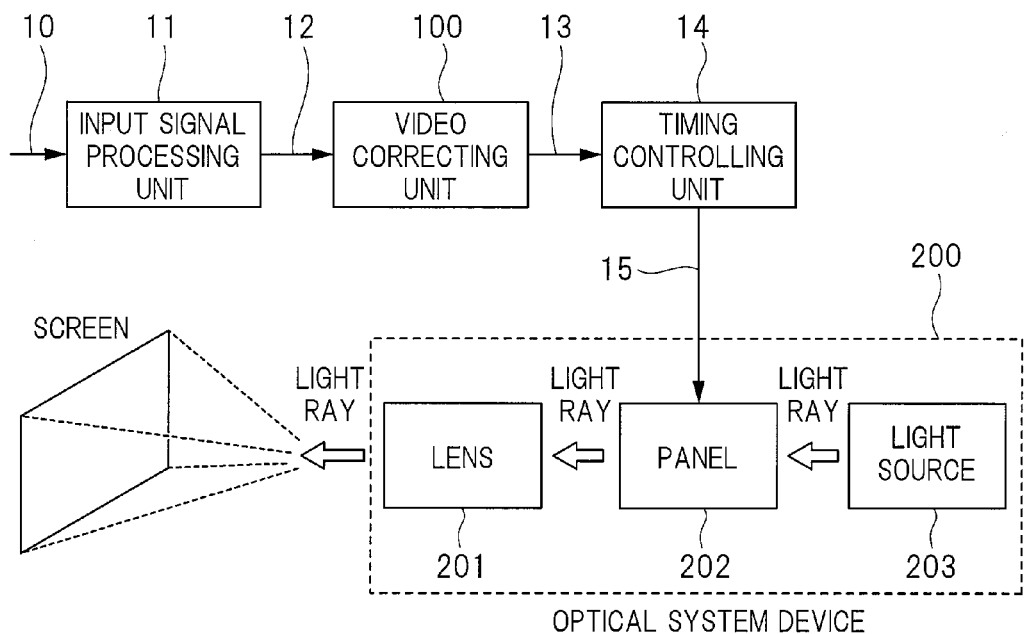
FIG. 1 is a diagram of a configuration example of a video display device according to a first embodiment of the present invention.

FIG. 1 is an example of a configuration diagram of the video display device of the present embodiment.

The present video display device has a configuration including: an input signal processing unit 11 which receives a video input signal 10 as an input and which converts the video input signal into an internal video signal 12 by, for example, a decoder, an IP conversion, a scalar, and others for a compressed video signal; a video correcting unit 100 which receives the internal video signal 12 as an input; a timing controlling unit 14 which receives a correction video signal 13 as an input and which generates a display control signal 15 based on horizontal/vertical synchronization signals of a display screen of the correction video signal; and an optical-system device 200 which displays a video.

The optical-system device 200 has a configuration including: an optical source 203 which emits a light ray for projecting the video to the screen; a panel 202 which receives the display control signal 15 as an input, which adjusts gradation of the light ray from the optical source 203 for each pixel, and which creates a projection video; and a lens 201 which is used for the magnification projection of the projection video onto the screen.

When the video display device is a direct-vision flat display such as a liquid crystal display, a plasma display, or an organic EL display, note that the lens 201 of the optical-system device 200 is not required. A user directly views the panel 202.

Figure 2:
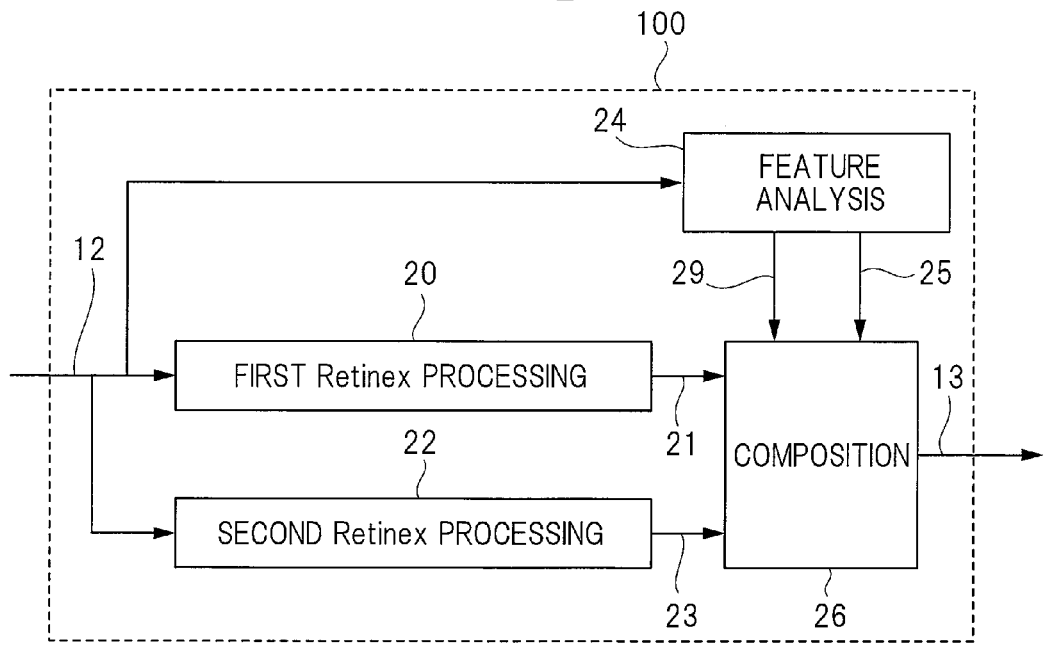
FIG. 2 is a diagram of a configuration example of a video correcting unit.

An example of a configuration of the video correcting unit 100 is illustrated in FIG. 2. A first Retinex processing unit 20 and a second Retinex processing unit 22 perform a video processing on the internal video signal 12 based on a Retinex theory, and output a first correction video signal 21 and a second correction video signal 23.

Here, the Retinex theory is a theory on a visual property of human eyes such as color constancy and brightness constancy. By the theory, an illumination light component can be separated from the video, and a reflected light component can be extracted.

Therefore, in a video correction process based on the Retinex theory, a high visibility video can be obtained even for a video in a dark room or under a bright backlight by removing an influence of the illumination light component being a cause by which an object such as a person in the video is difficult to be viewed and by extracting the reflected light component. Accordingly, a dynamic range which a human can naturally see and feel can be appropriately compressed even in a digital gradation.

The Retinex theory has a lot of models based on estimation methods of the illumination light component or the reflected light component. For example, in the following Reference Document 1, the models of McCann 99, PSEUDO, Poisson, and QP are compared.

In addition, a Retinex for extracting the reflected light component under estimation of a local illumination light component so as to follow a Gaussian distribution is called as a Center/Surround (hereinafter, referred to as C/S) Retinex. The models represented by the Retinex include a Single Scale Retinex model (hereinafter, SSR), a Multiscale Retinex model (hereinafter, referred to as MSR), and others.

The SSR is a model in which a luminance component of the reflected light with respect to one scale is extracted from the video (for example, see the following Reference Document 2), and the MSR is a model in which the SSR is expended and a luminance component of the reflected light with respect to a plurality of scales is extracted from the video (for example, see the Reference Document 3).

[Reference Document 1] "Comparison of Retinex Models for Hardware Implementation (Comparison Evaluation of Retinex theory in achieving Hardware of Adaptive Gradation Correction)", Yoshihiro NOZATO and others, Shin-gaku Technical Report, SIS2005-16, (2005).

[Reference document 2] D. J. Jobson and G. A. Woodell, Properties of a Center/Surround Retinex: Part 2. Surround Design, NASA Technical Memorandum, 110188, 1995.

[Reference document 3] Zia-ur Rahman, Daniel J. Jobson, and Glenn A. Woodell, "Multiscale Retinex For Color Image Enhancement", ICIP '96

In the present embodiment, as an example, the first Retinex processing unit 20 is assumed to use the McCann 99 model excellent in illumination light estimation performance, and the second Retinex processing unit 22 is assumed to use the MSR model excellent in contrast correction performance. A feature analyzing unit 24 analyzes a feature of the internal video signal 12, and outputs a first video composing control signal 29 and a second video composing control signal 25 to a video composing unit 26. The video composing unit 26 composes the correction video signal 21 and the correction video signal 23 based on the first video composing control signal 29 and the second video composing control signal 25, and outputs the correction video signal 13.

Figure 3:
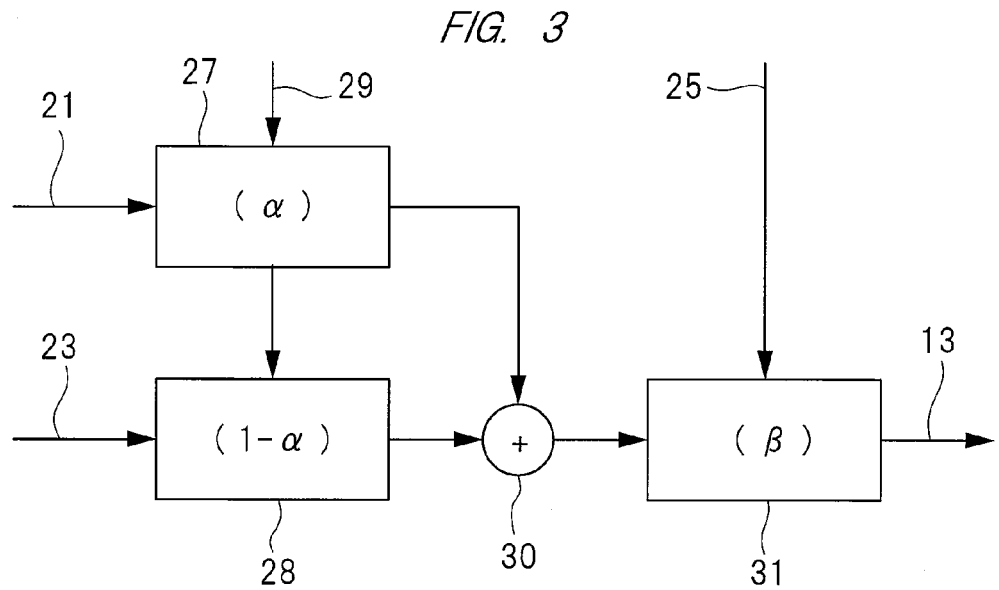
FIG. 3 is a diagram of a configuration example of a video composition unit.

FIG. 3 illustrates an example of a configuration of the video composing unit 26. The correction video signal 21 is magnified by "α" in a gain controlling unit 27, the correction video signal 23 is magnified by "(1−α)" in a gain controlling unit 28, and the both signals are subjected to an addition process in an adder 30, and then, are magnified by "β" in a gain controlling unit 31, so that the correction video signal 13 is obtained.

Next, an example of an operation of the configuration illustrated in FIGS. 1 to 3 will be described by using FIGS.

4A to C and FIGS. 5A to F. First, a control by the first video composing control signal 29 in the present embodiment will be described.

Figure 4A:
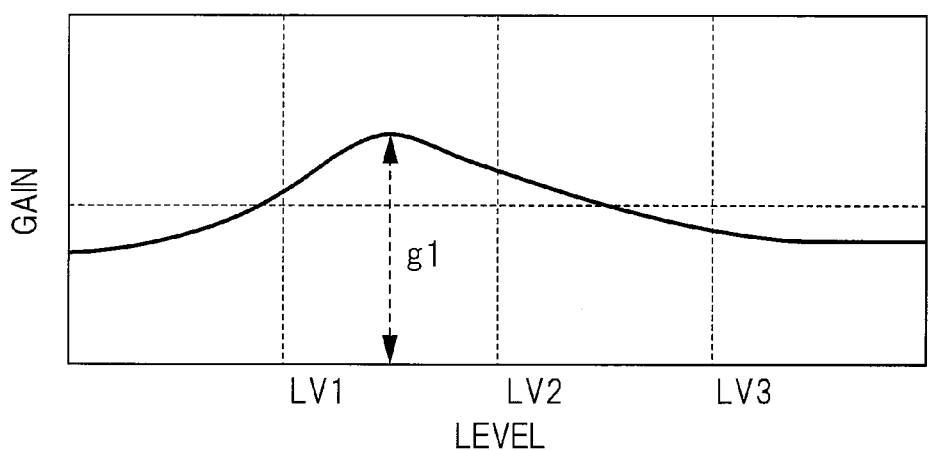
FIG. 4A is an example of a property of a first Retinex processing unit.
Figure 4B:
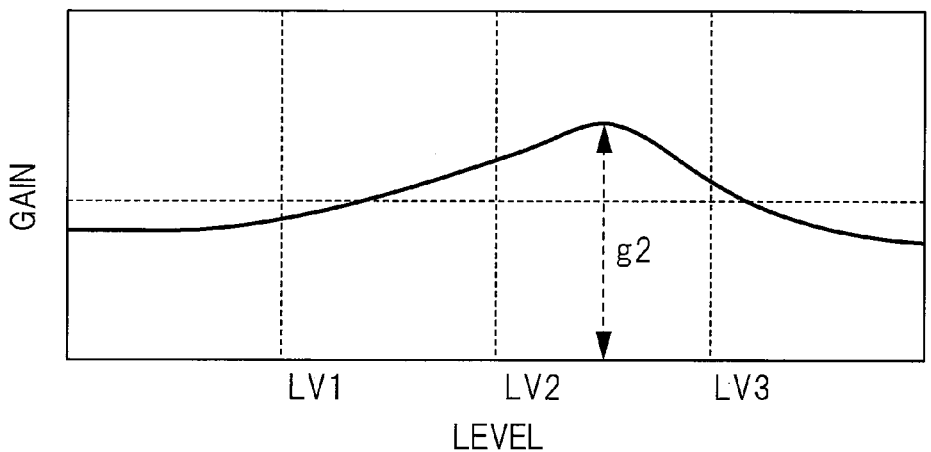
FIG. 4B is an example of a property of a second Retinex processing unit.

In FIGS. 4A and 4B, the horizontal axis represents a luminance level, the vertical axis represents a gain, and each of them shows an example of the gain property for the luminance levels of the first Retinex processing unit 20 and the second Retinex processing unit 22. In the present embodiment, the drawings illustrate an example of a case of usage of the McCann 99 model for the first Retinex processing unit 20 and usage of the MSR model for the second Retinex processing unit 22. In the example of FIG. 4A, the first Retinex processing unit 20 based on the McCann 99 model has a gain peak "g1" between luminance levels LV1 and LV2. In the example of FIG. 4B, the second Retinex processing unit 22 using the MSR model has a gain peak "g2" between LV2 and LV3.

Figure 4C:
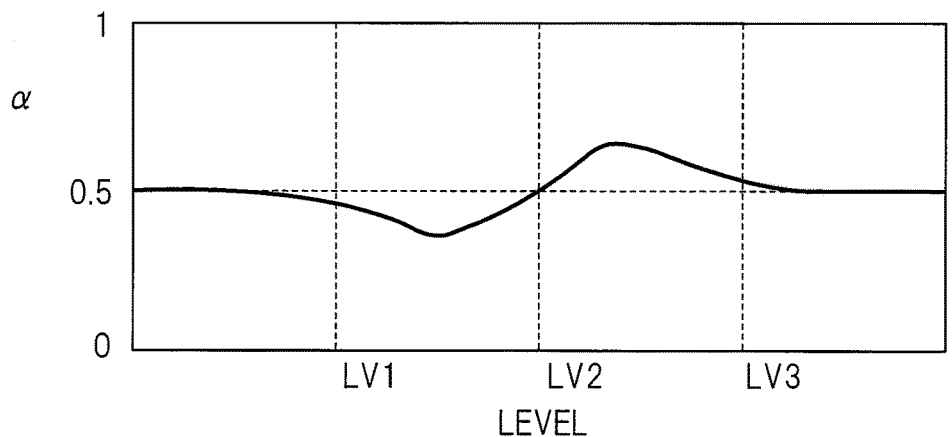
FIG. 4C is an example of a property of a video composition controlling signal.

FIG. 4C is a diagram illustrating an example of a composition control value "α" based on the first video composing control signal 29 outputted from the feature analyzing unit 24 illustrated in FIG. 2 in a case that the properties of the first Retinex processing unit 20 and the second Retinex processing unit 22 are as illustrated in the above-described FIGS. 4A and 4B. As illustrated in FIG. 4C, a configuration control value is controlled so that the composition control value α is decreased at a luminance level at which the gain of the first Retinex processing unit 20 is higher than the gain of the second Retinex processing unit 22, and, on the contrary, the composition control value α is increased at a luminance level at which the gain of the first Retinex processing unit 20 is lower than the gain of the second Retinex processing unit 22. In this manner, input/output properties of the composition output video of the first Retinex processing unit 20 and the second Retinex processing unit 22 which is outputted from the adder 30 have a linear property.

By the process described above, it is possible to obtain a composition video having both advantages of the Retinex processing based on the McCann 99 model excellent in the illumination light estimation performance and the Retinex processing based on the MSR model excellent in contrast correction performance.

Next, a control by using the second video composing control signal 25 in the present embodiment will be described.

Figure 5A:
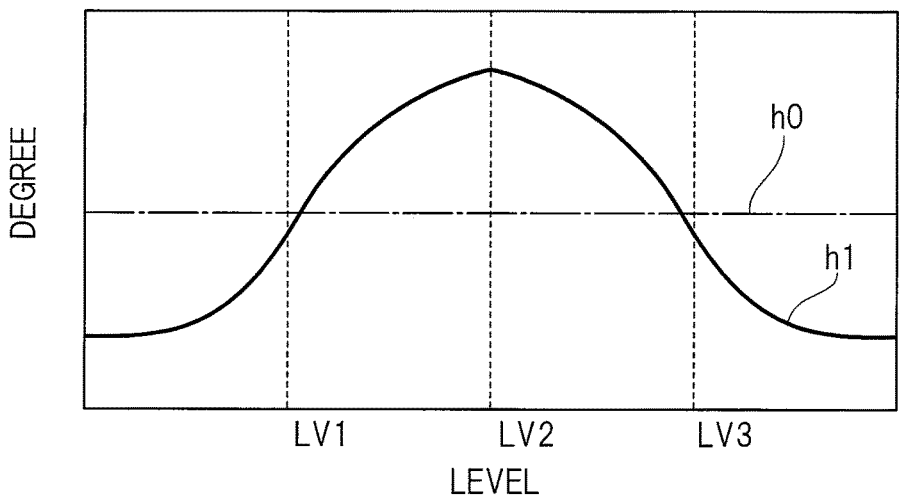
FIG. 5A is an example of luminance histogram of a video.
Figure 5B:
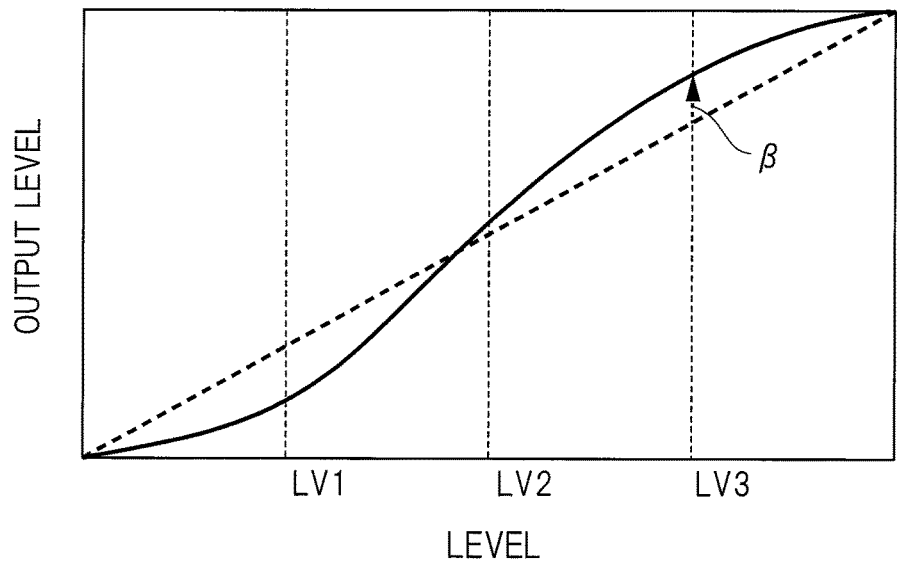
FIG. 5B is an example of an input/output property of a video.

FIGS. 5A and 5B illustrate an example of a control of the second video composing control signal 25 outputted from the feature analyzing unit 24.

First, in FIG. 5A, the horizontal axis represents a luminance level of a video, the vertical axis represents the number of pixels in one screen, and distribution of each luminance level is graphed as a histogram graph. In the example of FIG. 5A, a histogram h1 shows that the distribution in a range from the luminance level LV1 to the luminance level LV3 is larger than the distribution of the luminance level from the luminance level LV1 or lower and from the luminance level LV3 or higher. When the distribution in the range from the luminance level LV1 to the luminance level LV3 is flat, note that the distribution becomes a histogram h0 illustrated by a chain line.

In FIG. 5B, the horizontal axis represents a luminance level of an input video, the vertical axis represents a luminance level of an output video, and an example of the second video composing control signal 25 outputted from the feature analyzing unit 24 when the above-described luminance distribution of FIG. 5A is as the histogram h1. This drawing illustrates an input/output level property controlled by a gain control value β. When the luminance distribution of FIG. 5A is as the histogram h0, the input/output level property becomes the property illustrated by a dotted line of FIG. 5B. When the luminance distribution of FIG. 5A is as the histogram h1, the input/output level property becomes the property illustrated by a solid line of FIG. 5B. Here, an item β takes the linear property illustrated by a dotted line as a reference value (β=1). The property as illustrated by the solid line of FIG. 5B is obtained by varying the gain control value β0 in accordance with an input level. In the example of FIG. 5B, the gain control value β is 1 at LV2, but becomes a value smaller than 1 at LV1, and becomes a value larger than 1 at LV3. As described above, in the case of the histogram h1 of FIG. 5A, the input/output property curve in the range from LV1 to LV3 having the large luminance distribution is controlled by the gain control value β so as to be steep as compared with a slope in other range. By obtaining the correction video signal 13 in such a property, more output luminance levels are assigned to an area having a large distribution in the video, and therefore, a video having a good visibility can be obtained.

FIGS. 5C to 5F are diagrams for describing an example of the control performed when the luminance distribution is different from FIG. 5A.

Figure 5C:
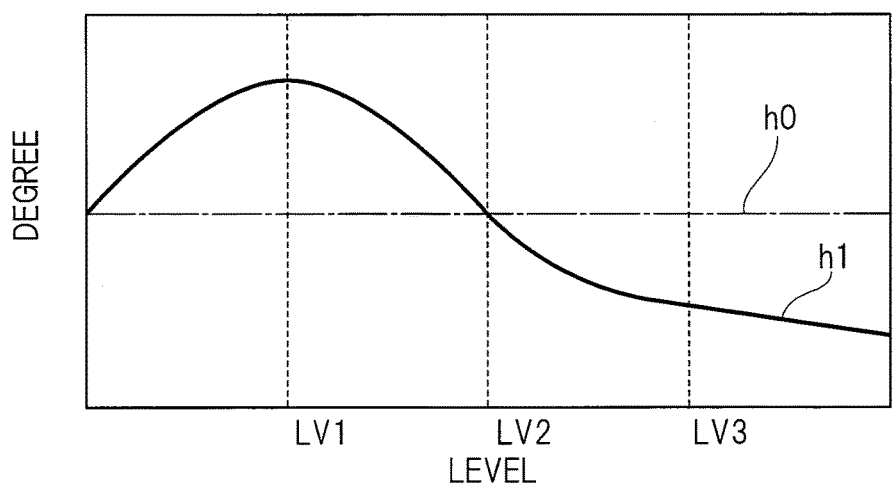
FIG. 5C is an example of luminance histogram of a video.
Figure 5D:
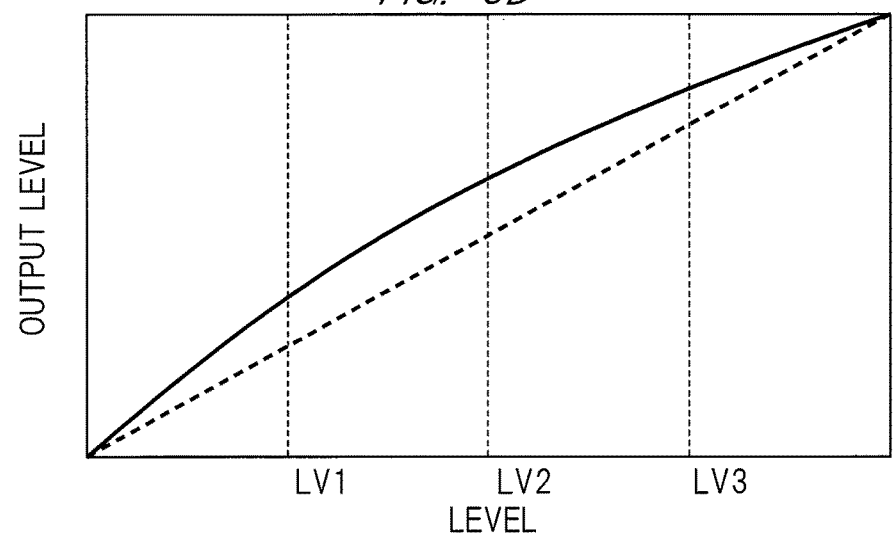
FIG. 5D is an example of an input/output property of a video.

First, FIG. 5C illustrates an example of a histogram obtained when the luminance distribution at the luminance level LV2 or lower is larger than that at the luminance level LV2 or higher. An example of the gain control value β in this case is illustrated in FIG. 5D. As illustrated in FIG. 5D, the slope of the property curve at the LV2 or lower having the large luminance distribution is controlled so as to be steep as compared to that at the luminance level LV2 or higher, so that more output luminance levels are assigned to a luminance band having the large video distribution. In this manner, a video having a good visibility can be obtained.

Figure 5E:
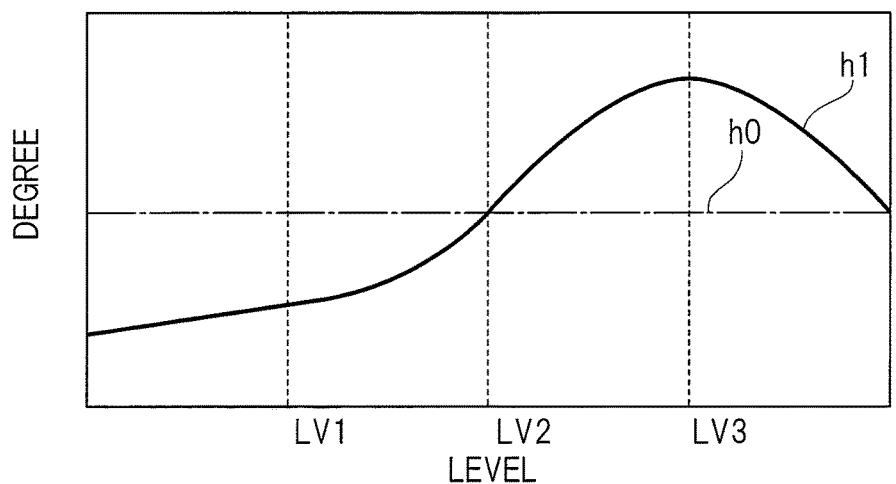
FIG. 5E is an example of luminance histogram of a video.
Figure 5F:
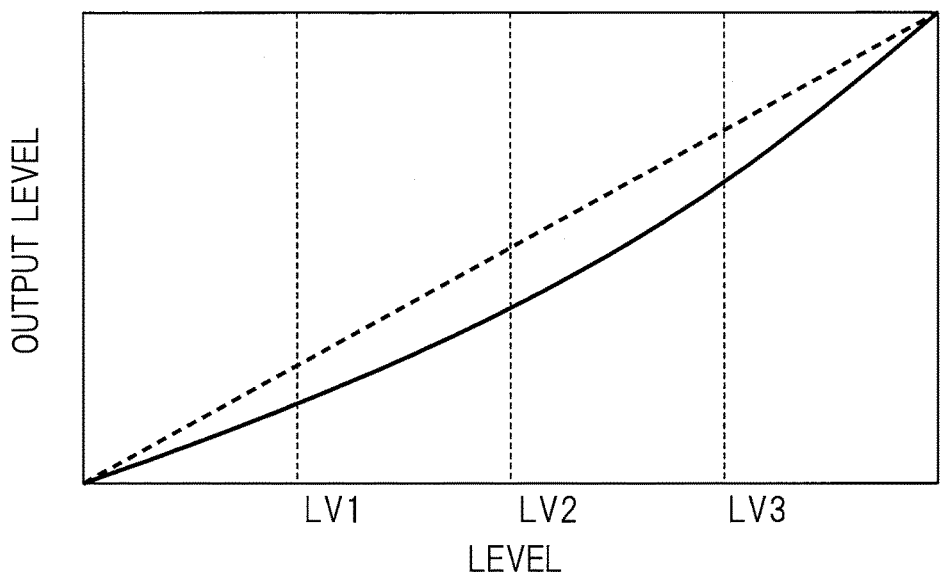
FIG. 5F is an example of an input/output property of a video.

Next, FIG. 5E illustrates an example of a histogram obtained when the luminance distribution at the luminance level LV2 or higher is larger than that at the luminance level LV2 or lower. An example of the gain control value β in this case is illustrated in FIG. 5F. As illustrated in FIG. 5F, the slope of the property curve at the LV2 or more when the luminance distribution is large is controlled to be steep as compared to the luminance level LV2 or lower, so that more output luminance levels are assigned to a luminance band having the large video distribution. Therefore, it a video having a good visibility can be obtained.

By a series of control of the video composing unit 26 described above, it is possible to obtain a video having a good visibility while taking both advantages of the Retinex processing based on the McCann 99 model excellent in illumination light estimation performance and the Retinex processing based on the MSR model excellent in contrast correction performance.

In the above description, note that a combination of the Retinex models is not limited to the above-described examples, but may be a combination of Retinex models of different methods. In addition, the combination is not limited to the combination of two models, but may be a combination of three or more models. In this case, the plurality of Retinex processing units illustrated in FIG. 2 may be configured to be arranged in parallel to compose the corrected video of each Retinex processing unit by the composition processing unit 26 so as to obtain the correction video signal 13.

Second Embodiment

A second embodiment is an example which is different from the first embodiment in the operation of the video correcting unit 100 in the video display device of FIG. 1. The following is explanation for the difference from the first embodiment. Particularly, apart without the explanation is the same as that of the first embodiment, and therefore, the explanation will be omitted.

The video correcting unit 100 of the second embodiment will be described by using FIG. 2. The first Retinex processing unit 20 and the second Retinex processing unit 22 perform the video processing on the internal video signal 12 based on the Retinex theories having different methods, and output the correction video signal 21 and the correction video signal 23. In the present embodiment, it is assumed that the second Retinex processing unit 22 performs a large scale of Retinex processing than that of the first Retinex processing unit 20. Here, the scale of the Retinex processing is a size of a pixel range which is referred to in the Retinex processing.

The feature analyzing unit 24 analyzes a feature of the internal video signal 12, and outputs the first video composing control signal 29 and the second video composing control signal 25 to the video composing unit 26. The video composing unit 26 composes the correction video signal 21 and the correction video signal 23 based on the video composing control signal 29 and the video composing control signal 25, and outputs the correction video signal 13.

Here, the second video composing control signal 25 and the gain control value $\beta$ of the second embodiment are the same as those of the first embodiment, and thus the description thereof will be omitted.

The gain control value $\alpha$ by the first video composing control signal 29 of the second embodiment is different from that of the first embodiment. The following is its explanation.

Figure 6:
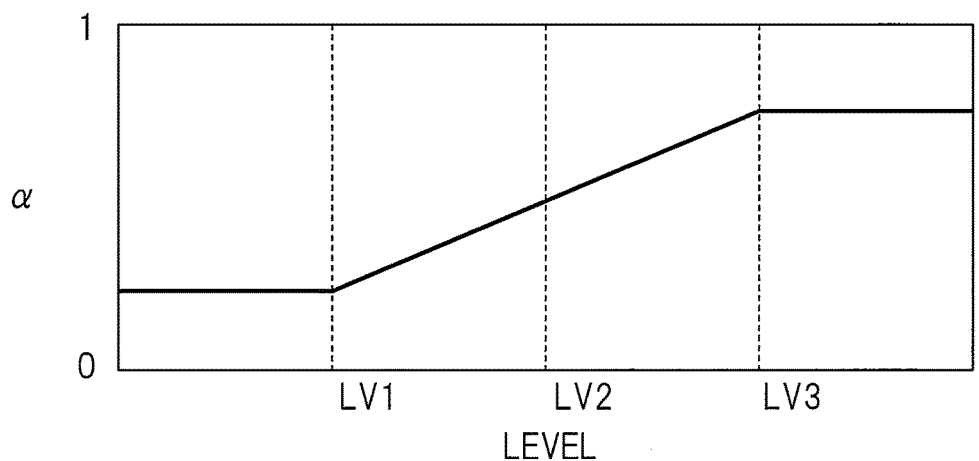
FIG. 6 is a diagram of an operational property of a feature analyzing unit.

FIG. 6 illustrates an example of the output property of the first video composing control signal in the feature analyzing unit 24 according to the second embodiment. In FIG. 6, the horizontal axis represents a luminance level of a video, and the vertical axis represents a value of the first video composing control signal 29. As illustrated in FIG. 6, for example, $\alpha$ becomes small when the luminance level is low, and $\alpha$ becomes large when the luminance level is high. By controlling the $\alpha$ as described above, a composition ratio can be changed in accordance with the luminance level. When the luminance level is small in the correction video signal 13 obtained by the video composing unit 26, a ratio of the second Retinex processing unit 22 can be increased. In addition, when the luminance level is large, a ratio of the first Retinex processing unit 20 can be increased. That is, a component from the first Retinex processing unit 20 having a small scale of the Retinex processing includes a lot of reflected light components having a relatively high frequency component. Therefore, by increasing the composition ratio in a video area having a high luminance, the definition of the video can be increased. In addition, a component of the second Retinex processing unit 22 having a large scale of the Retinex processing includes a lot of reflected light components having a relatively low frequency component. Therefore, by increasing the composition ratio in a video area having a low luminance, the visibility of a shadow portion of the video can be increased. Note that the property illustrated in FIG. 6 is an example, and the maximum value, the minimum value, the slope, and others at each luminance level may be determined in accordance with the property of the Retinex processing.

In the embodiment described above, the example of generation by the video composing control signal 29 in accordance with the luminance level of the video has been described. However, the control in accordance with a frequency component may be adopted. As the case of the control in accordance with the frequency component, in a case of the high frequency component for each area of the video signal, the ratio of the video signal obtained from the Retinex processing unit having a small scale size is increased in the correction video signal 13. In a case of the low frequency component for each area of the video signal, the ratio of the video signal obtained from the Retinex processing unit having a large scale size is increased in the correction video signal 13. Furthermore, the composition control using both the luminance level and the frequency component of the video may be performed. In this case, for example, the control may be performed by the above-described control value in accordance with the luminance level and a normalization value obtained by additional or product calculation of the control value in accordance with the frequency component.

According to the second embodiment of the present invention described above, both of the definition of the video and the visibility of the shadow portion can be achieved by composing the corrected videos of the plurality of different Retinex processing in accordance with the scale of the Retinex processing.

Third Embodiment

Figure 7:
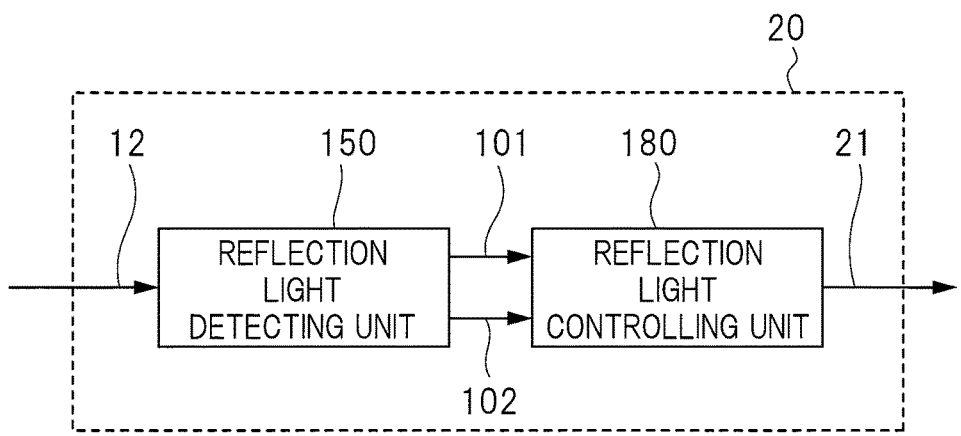
FIG. 7 is an example of a configuration of a Retinex processing unit according to a third embodiment of the present invention.

Next, the description will be made about an embodiment when a different Retinex model is used in the video correcting unit 100 in the video display device illustrated in FIG. 1. As the configuration of the video correcting unit 100, the configuration of FIG. 5 is used as an example. However, the configuration is not limited thereto. FIG. 7 illustrates a configuration example of the first Retinex processing unit 20 including: a reflected light detection unit 150 which receives the internal video signal 12 as an input signal and detects two reflected light components 101 and 102 through the video processing based on the Retinex theory; and a reflected light control unit 180 which receives the detected two reflected light components as inputs, which adjusts the reflected light, and then which outputs the correction video signal 13 through the recomposition.

Next, the reflected light detection unit 150 and the reflected light control unit 180 will be described.

In accordance with a nature of an object, the reflection of light is classified into, for example, light (hereinafter, referred to as a specular component) reflected as specular reflection on such a smooth surface as a mirror, light (hereinafter, referred to as a diffusing component) reflected as diffuse reflection by small asperity on a rough surface, and ambient light (hereinafter, referred to as an ambient component) scattered by being repeatedly reflected on the peripheral environment.

For example, in a three-dimensional computer graphic field, there is a Phong reflection model as a reflection model expressing the shadow of the surface of the object by using such natures of three types of light. According to the Phong reflection model, the material can be expressed by a magnitude of the reflection of the light.

For example, when a spot light is emitted to a plastic spherical object, a small circular highlight having a high luminance is formed. In addition, in a rubber spherical object, a radius of the highlight is wider but the luminance is lower than those of the plastic spherical object. The highlight portion is the specular component. In addition, also in the diffusing component and the ambient component, the luminance is different in accordance with the material.

Figure 10:
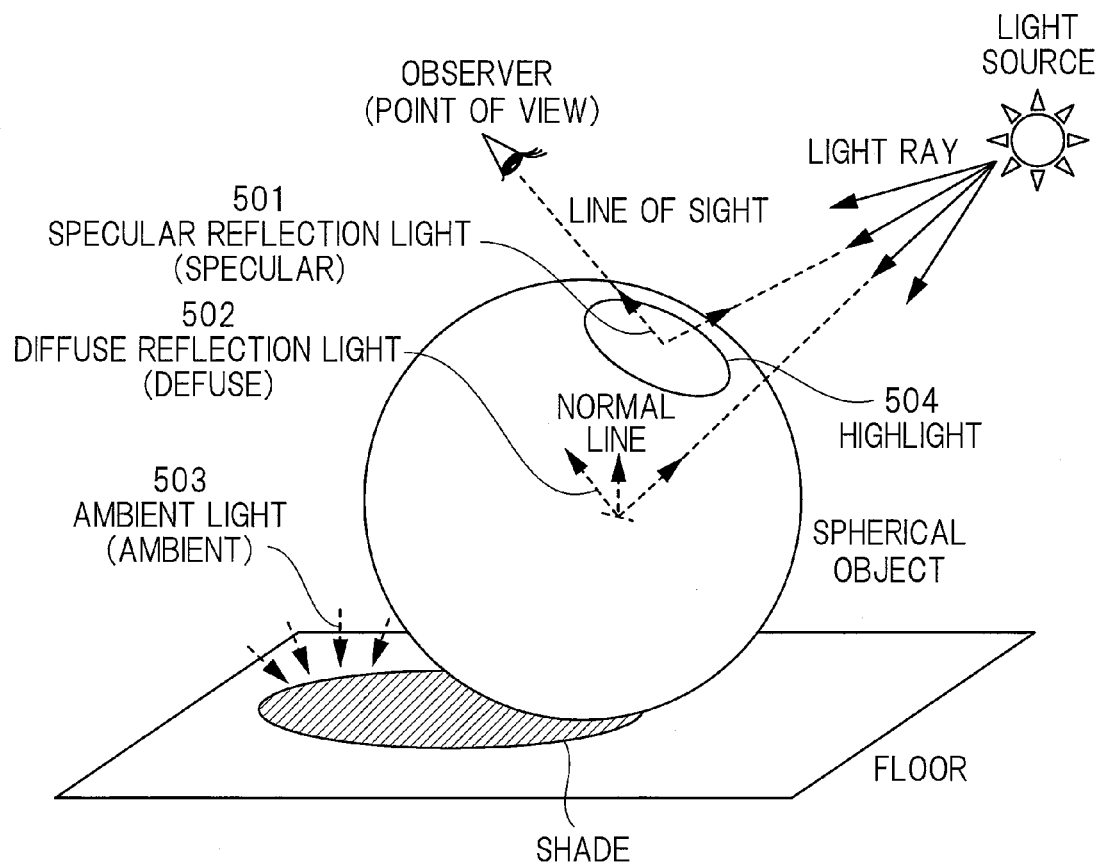
FIG. 10 is a diagram for describing a property of the reflected light according to a Phong reflection model.

FIG. 10 is a diagram for describing an example of the Phong reflection model. The drawing includes an optical source, light ray extending from the optical source, a spherical object which the light ray reaches, a floor on which the spherical object is placed, and an observer who observes the scene. The observation is performed at a position of the viewpoint, and may be performed by actual observation through eyes, and may use an observation machine such as a camera.

The specular component in FIG. 10 is light 501 obtained by reflection of a light ray on the surface of the spherical object in a line-of-sight direction. The component is formed by the reflection of the light ray on the spherical object, and a circular highlight 504 in the drawing is a region of the specular component. For example, in the case of the plastic spherical object, a small circular highlight having a high luminance is formed. In addition, in the case of the rubber spherical object, the radius of the highlight is wider and the luminance is lower than those of the plastic one. In the Phong reflection model, it is assumed that the specular component follows the power of cosine between the line of sight and the reflected light.

The diffusing component in FIG. 10 is the diffused reflection light of light 502 obtained by the hitting of the light ray onto the spherical object. The luminance of the diffusing component is determined by direction of the light ray and the spherical object, that is, by cosine between the light ray and a normal line, and therefore, a portion of the spherical object on which the light directly hits becomes a region of the diffusing component.

The ambient component in FIG. 10 is light 503 which goes around the shadow portion. The component is the light which is the scattered light reflected on the peripheral environment several times, averaged by the peripheral environment, and left. Therefore, even the shadow portion which the light does not directly reach has a constant luminance. The brightness of the diffused reflection light forming the shadow is determined by cosine between the light ray and the direction of the surface of the spherical object, that is, cosine between a vector of the light ray and a normal line.

From the above description, the Phong reflection model is shown as the following Expression.

$$I = k_d \sum_{j=1}^{l} (\vec{N} \cdot \vec{L}) m_d + k_s \sum_{j=1}^{l} (\vec{R} \cdot \vec{V})^n I_j + I_a$$ [Mathematical Expression 1]

Accordingly, the reflected light in the reflected light detection unit according to the present embodiment is assumed to include the ambient component, the diffusing component, and the specular component, and it is assumed that the ambient component in the video follows a Gaussian distribution having a wide scale, the diffusing component follows a luminance distribution based on cosine, and the specular component follows a luminance distribution based on the power of cosine. When it is assumed that a filter of the ambient component is set to Fa(x, y), a filter of the diffusing component is set to Fd(x, y), and a filter of the specular component is set to Fs(x, y), each filter is as the following Expressions.

$$F_a(x, y) = \frac{1}{\sqrt{2\pi}\sigma} e^{-\frac{x^2+y^2}{2\sigma^2}}$$ [Mathematical Expression 2]

$$F_d(x, y) = \cos\left(\frac{\pi\sqrt{x^2+y^2}}{k}\right)/N$$ [Mathematical Expression 3]

$$F_s(x, y) = \cos^n\left(\frac{\pi\sqrt{x^2+y^2}}{k}\right)/N^n$$ [Mathematical Expression 4]

Figure 11A:
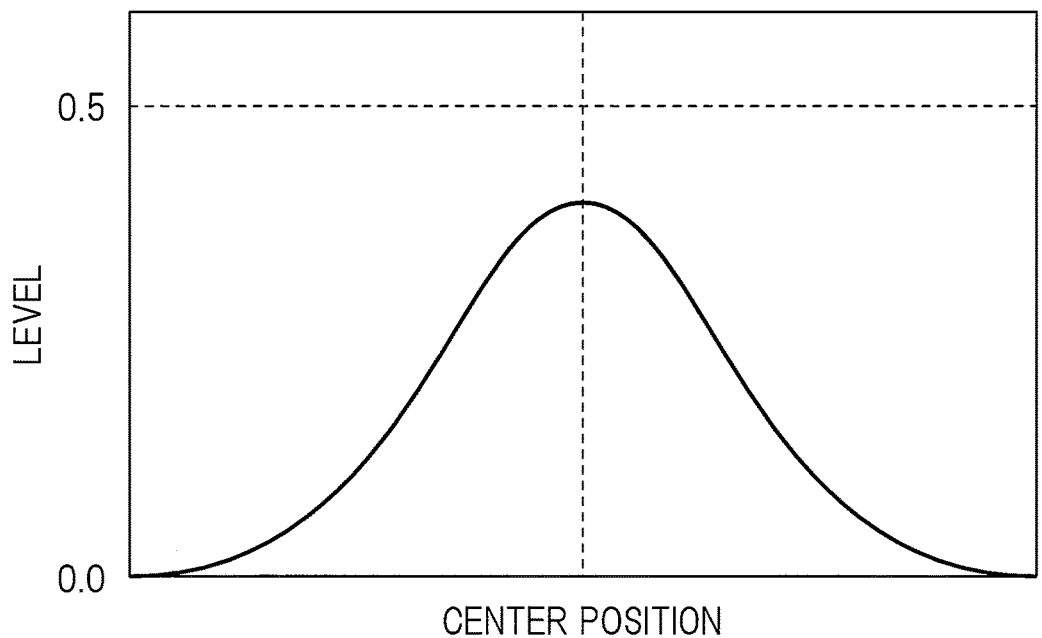
FIG. 11A is a diagram for describing a Gaussian distribution.
Figure 11B:
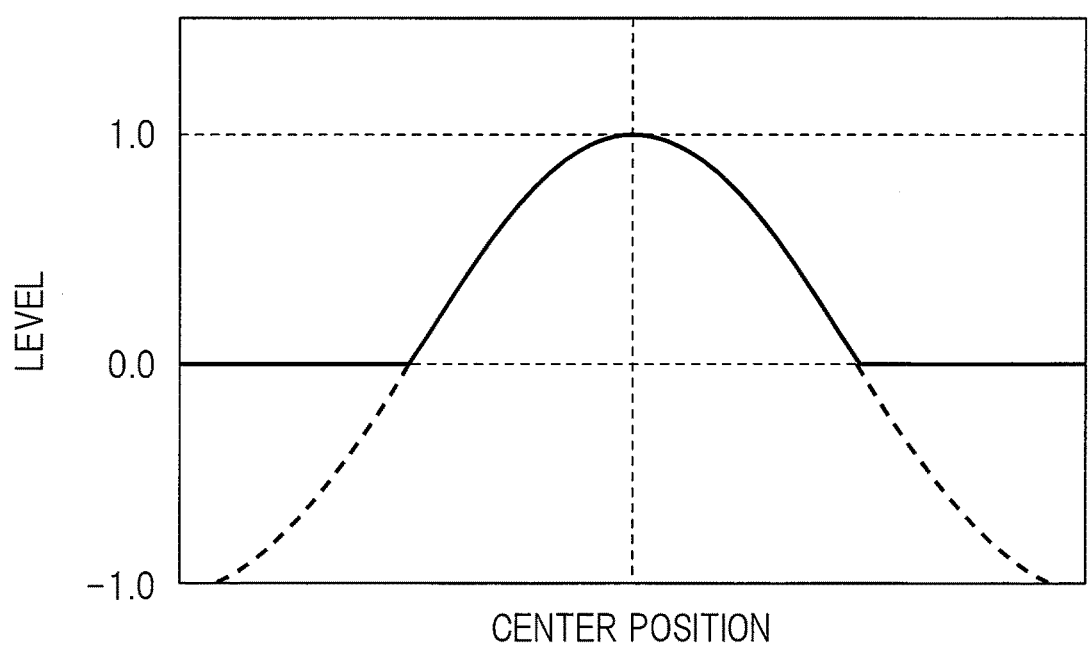
FIG. 11B is a diagram for describing a luminance distribution based on a cosine.
Figure 11C:
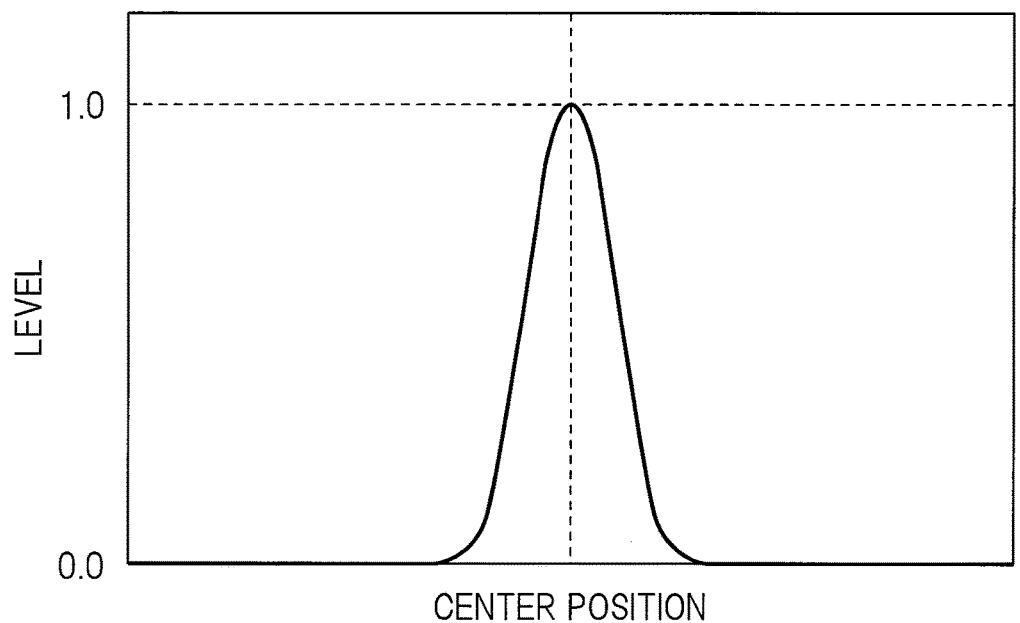
FIG. 11C is a diagram for describing a luminance distribution based on the power of cosine.

In addition, FIGS. 11A, 11B, and 11C are diagrams for describing the distributions of the ambient component, the diffusing component, and the specular component each expressed with the luminance level on a vertical axis and with a one-dimensional positional coordinates on a horizontal axis. In this manner, it can be seen that the levels of the distributions of the diffusing component and the specular component are steeped more than that of the Gaussian distribution of the ambient component.

Here, a video "Ia" by the filter of the ambient component is entirely averaged, and therefore, the video contains almost only the ambient component. In a video "Id" by the filter of the diffusing component, the specular component is averaged by the filter, and the video contains almost only the ambient component and the diffusing component. A video "Is" by the filter of the specular component is not almost averaged, and therefore, all of the ambient component, the diffusing component, and the specular component are left. This point is expressed by Expression 5.

Ambient=$I_a$, Diffuse=$I_d$-$I_a$, Specular=$I_s$-$I_d$ [Mathematical Expression 5]

In this point, when a reflection component by a logarithm space is obtained as similar to the MSR, Expression 6 is obtained.

$R_{Phong,i}(x,y) = W_d R_{Diffuse,i}(x,y) + W_s R_{Specular,i}(x,y)$ $R_{Specular,i}(x,y) = \log \bar{I}_{s,i}(x,y) - \log \bar{I}_{d,i}(x,y) = \log [F_s(x,y) \otimes I(x,y)] - \log [F_d(x,y) \otimes I(x,y)]$ $R_{Diffuse,i}(x,y) = \log \bar{I}_{d,i}(x,y) - \log \bar{I}_{a,i}(x,y) = \log [F_d(x,y) \otimes I(x,y)] - \log [F_a(x,y) \otimes I(x,y)]$ [Mathematical Expression 6]

In addition, the specular component of a mirror, a metal plate, and others is considered to be total reflection, and therefore, the power of cosine is infinite. At this time, for the reflection component based on the specular component, Expression 7 may be used.

$R_{Specular,i}(x,y) = \log I(x,y) - \log [F_d(x,y) \otimes I(x,y)] = \log I_i(x,y) - \log \bar{I}_{d,i}(x,y)$ [Mathematical Expression 7]

In addition, the ambient component is the average light of the entire environment, and therefore, a mean filter or an average luminance may be used instead of the Gaussian filter. For example, when the average luminance is used, Expression 8 can be obtained.

$R_{Diffuse,i}(x,y) = \log \bar{I}_{d,i}(x,y) - \log [\Sigma I(x,y)/num] = \log \bar{I}_{d,i}(x,y) - \log \bar{I}_{a,i}(x,y)$ [Mathematical Expression 8]

Figure 12A:
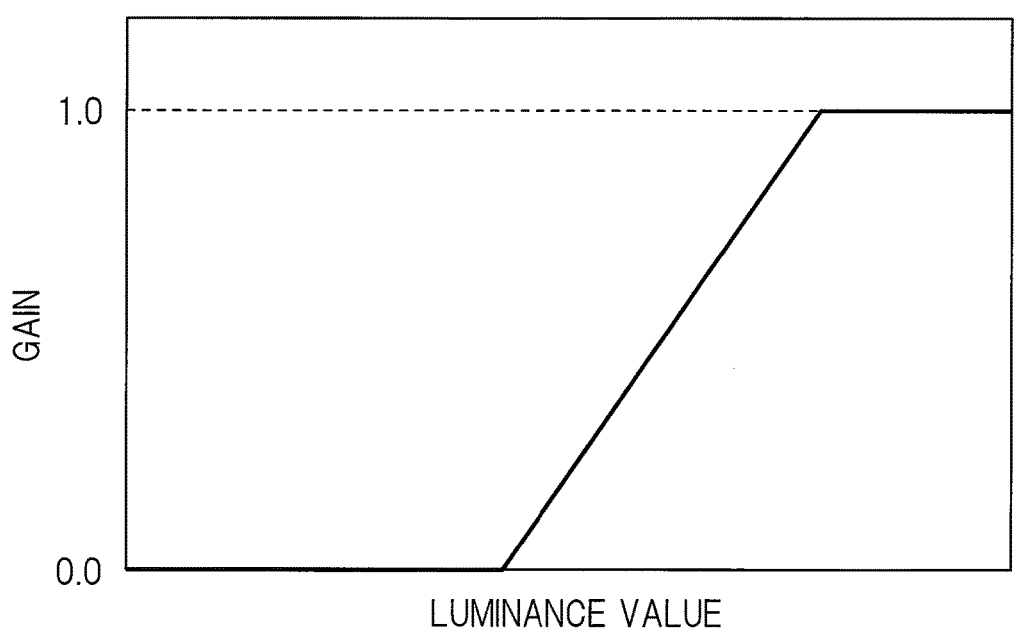
FIG. 12A is a diagram for describing a specular correction gain based on a luminance value of a video.
Figure 12B:
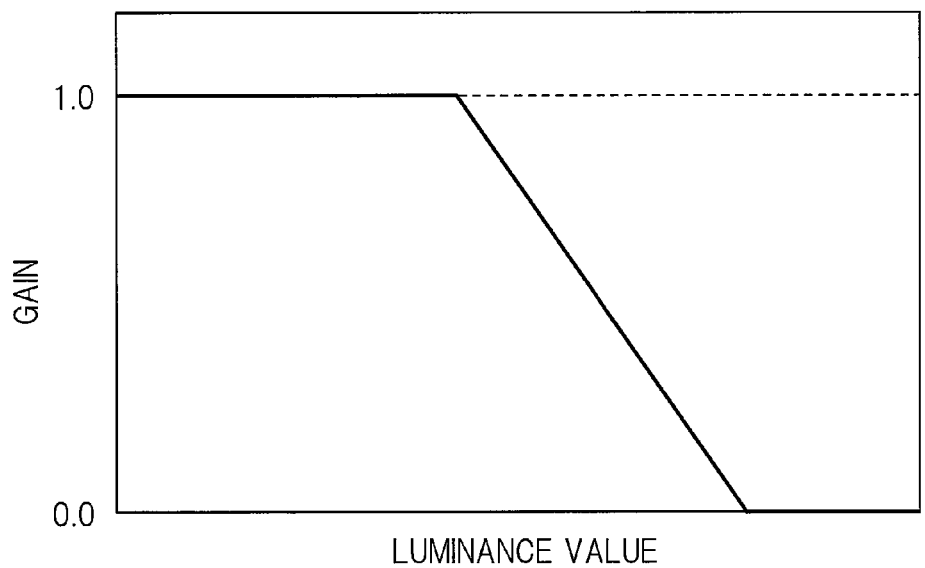
FIG. 12B is a diagram for describing a diffusion correction gain based on a luminance value of a video.

In addition, the specular component is highly visible at the highlight having a high luminance in many cases, and the diffusing component may be a middle or lower luminance in many cases. Accordingly, for example, a gain of a high luminance area as illustrated in FIG. 12A may be added to the specular component Rspecular of Expression 6, and a gain of a middle or lower luminance area as illustrated in FIG. 12B may be added to the diffusing component Rdiffuse. Here, in a case of assumption that the input/output curve of FIG. 12A is set to "g(I)", the gain becomes 0 when an input luminance "I" is a low luminance, the gain is gradually increased from a middle luminance, and the gain becomes 1 when the input luminance is a high luminance. When it is assumed that the input/output curve of FIG. 12B is set to "1−g(I)", the gain is 1 when the luminance is low, the gain is gradually decreased from the middle luminance, and the gain becomes 0 when the luminance is high.

In addition, as similar to the example of the MSR, when a gain and an exponential function are added to Expression 6 after the weighed average, a homomorphic filter can be obtained. For such a homomorphic filter, a logarithm function and an exponential function may be approximated by, for example, a function using a power method and the inverse function thereof. In this case, Expression 9 is obtained when the function is set to "f".

$$R_{Phong,i}(x,y) = W_d R_{Diffuse,i}(x,y) + W_s R_{Specular,i}(x,y)$$

$$R_{Specular,i}(x,y) = f(F_s(x,y) \otimes I(x,y)) - f(F_d(x,y) \otimes I(x,y)) = f(\overline{I}_{s,i}(x,y)) - f(\overline{I}_{d,i}(x,y))$$

$$R_{Diffuse,i}(x,y) = f(F_d(x,y) \otimes I(x,y)) - f(F_a(x,y) \otimes I(x,y)) = f(\overline{I}_{d,i}(x,y)) - f(\overline{I}_{a,i}(x,y))$$

[Mathematical Expression 9]

As described above, by using the Phong reflection model, the correction is performed in consideration of the nature of reflection.

Expression 9 will be described by using FIGS. 8 and 9.

Figure 8:
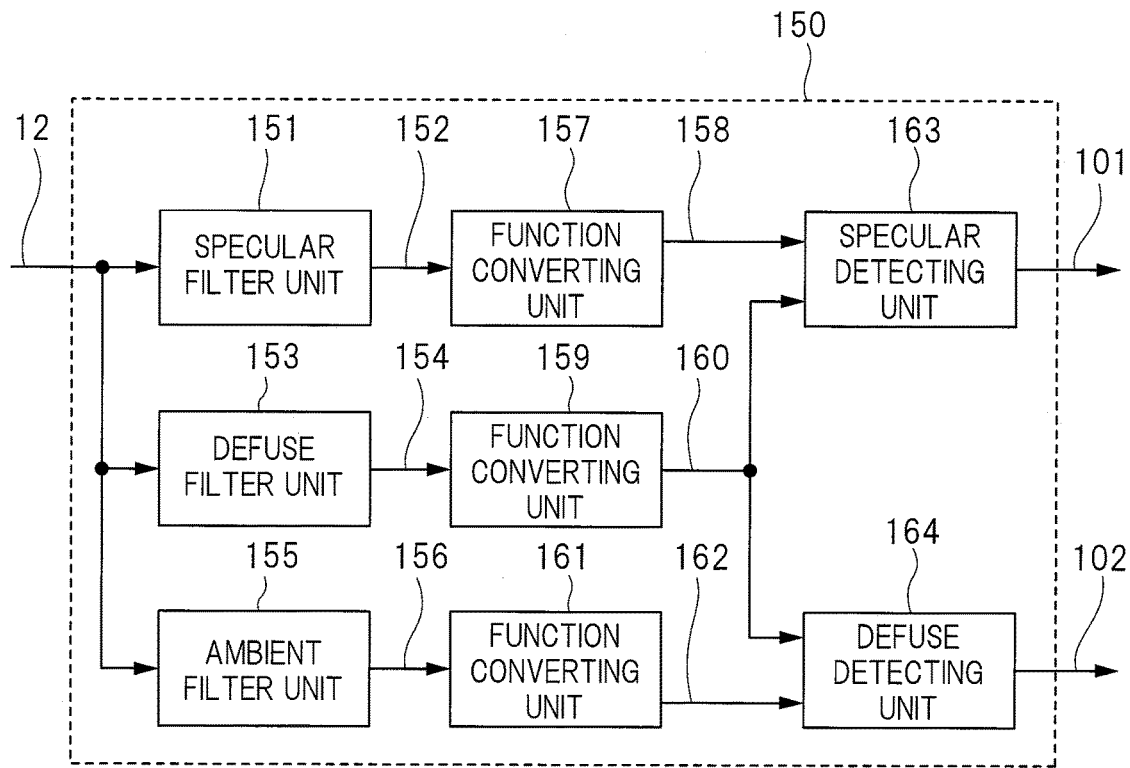
FIG. 8 is an example of a configuration of a reflected light detecting unit.

FIG. 8 is a diagram for describing a process of the reflected light detection unit according to the third embodiment. The reflected light detection unit 150 includes a specular filter unit 151, a diffusion filter unit 153, an ambient filter unit 155, function converting units 157, 159, and 161, a specular detection unit 163, and a diffusion detecting unit 164. Note that the function converting unit may perform approximation using a logarithm function or a function of a power.

Figure 9A:
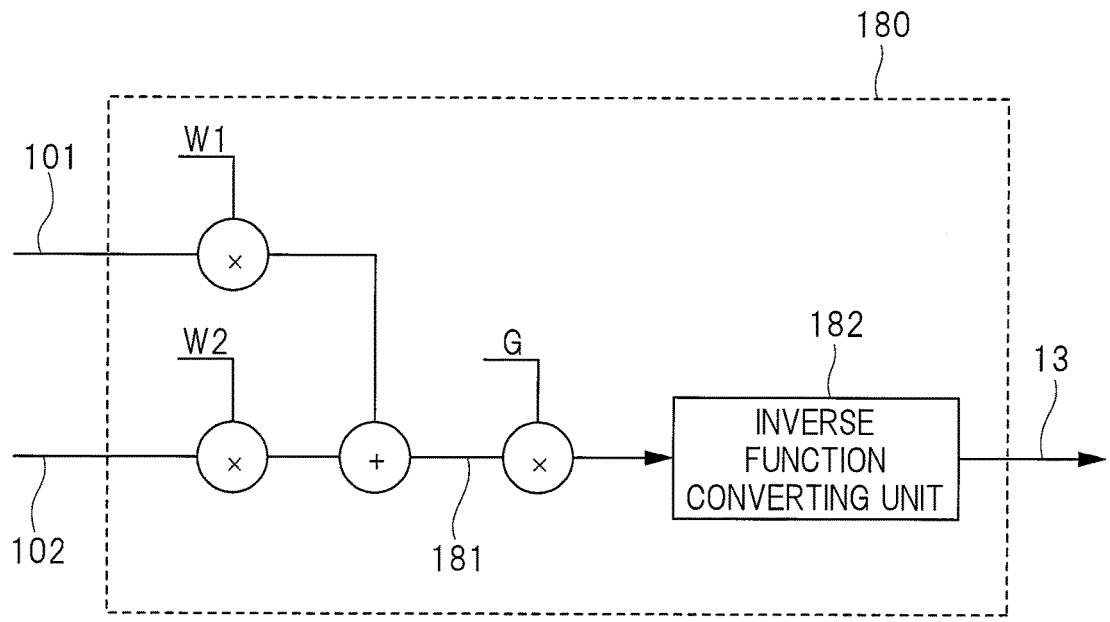
FIG. 9A is an example of a configuration of a reflected light controlling unit.
Figure 9B:
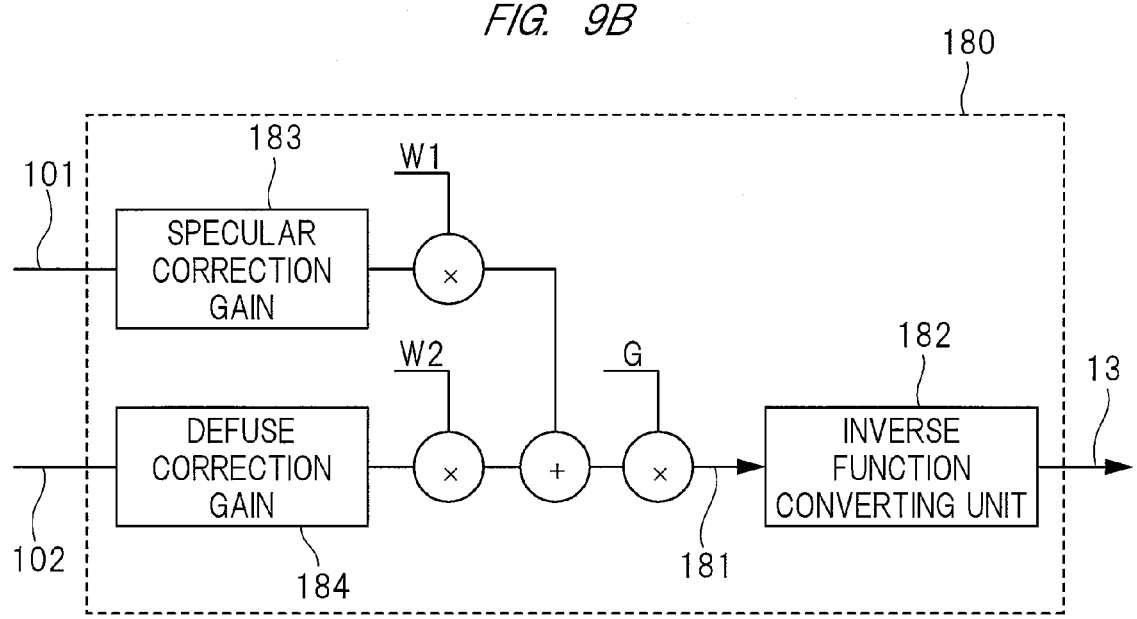
FIG. 9B is an example of a configuration of the reflected light controlling unit.

FIG. 9A is a diagram for describing a process of the reflected light control unit according to the first embodiment. The reflected light control unit 180 may be configured with the weighted average of weights W1 and W2, and may be configured with the weighted average of the weights W1 and W2, a gain G, and an inverse function converting unit 182. However, the inverse function converting unit is configured with a function inverse to the function used in the function converting unit. In addition, as illustrated in FIG. 9B, a specular correction gain 183 which has a high gain in the high luminance region of FIG. 12A and a diffusion correction gain 184 which has a high gain in the middle or lower luminance region of FIG. 12B may be added to the configuration of FIG. 9A.

According to the above configuration, when the reflected light component is extracted, the video is decomposed for each nature of reflection of the light, that is, for each of the specular component, the diffusing component, and the ambient component, and a correction amount is changed in accordance with each nature, so that the first correction video signal 21 having a high texture in consideration of the material of the object in the video can be obtained from the first Retinex processing unit 20.

Next, the second Retinex processing unit 22 is assumed to perform a video correction using the MSR model. At this time, a process having a larger scale size than that of the above-described first Retinex processing unit 20 is performed.

With such a configuration described above, the first correction video signal 21 becomes a video signal in consideration of the nature of the object, and the second correction video signal 23 becomes a video signal subjected to the contrast correction in a relatively large area of the video. These correction video signals are subjected to composition as similar to the operation of the video composing unit 26 described in the second embodiment. In this manner, since a ratio of the second correction video signal is large in a region of the low luminance level of the video, a contrast improving effect is increased. Further, since a ratio of a video correction signal in consideration of the nature of the object is large in a region of the high luminance level of the video, a video having a good visibility can be obtained over the entire region of the luminance level of the video as the correction video signal 13.

According to the third embodiment of the present invention described above, an output video having a higher texture in addition to the effect of the second embodiment described above can be obtained.

Fourth Embodiment

In the present embodiment, an example of an adaptive control in consideration of an external light under usage environment in the video display device of the present invention will be described.

Figure 13:
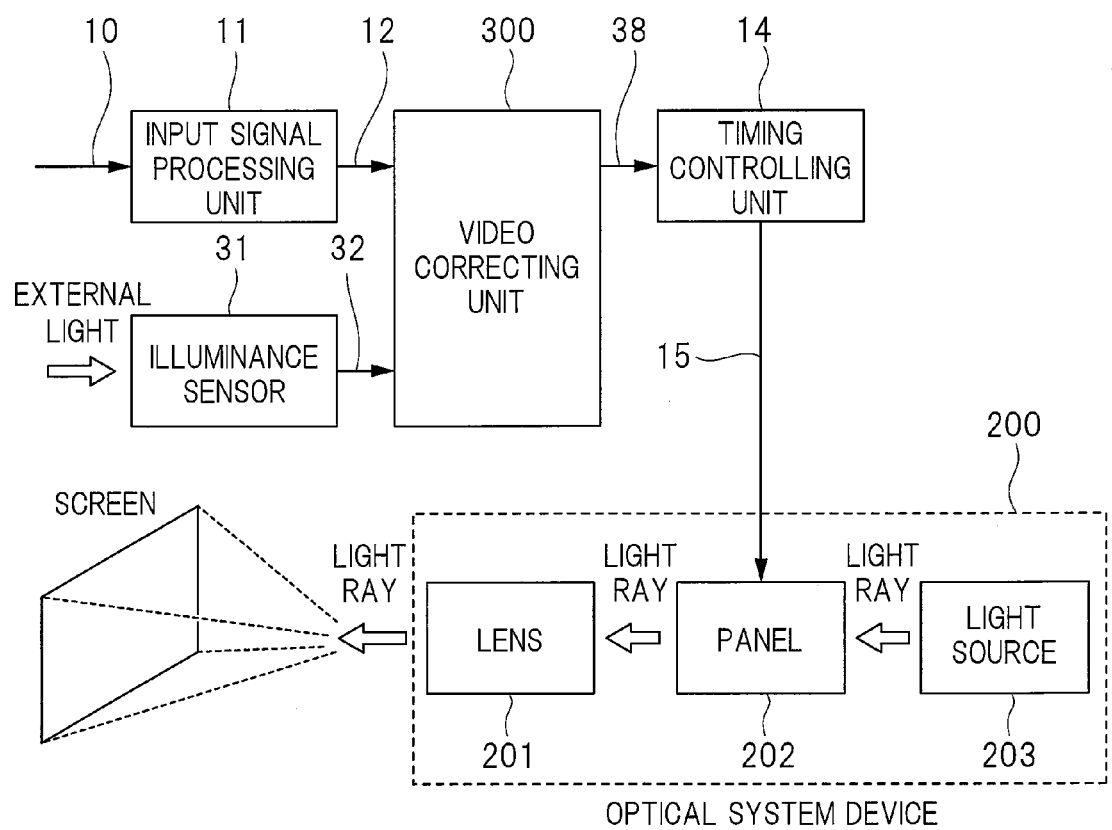
FIG. 13 is an example of a configuration diagram of a video display device according to a fourth embodiment of the present invention.

FIG. 13 is an example of a configuration diagram of the video display device of the present embodiment.

The present video display device includes: an input signal processing unit 11 which receives the video input signal 10 as an input and which converts the video input signal into, for example, an internal video signal 12 by a decoder, an IP conversion, a scalar, or others for a compressed video signal; an illuminance sensor 31 which receives the external light as an input and which outputs, for example, an illuminance level signal 32 of 256 steps; a video correcting unit 300 which receives the internal video signal 12 and the illuminance level signal 32 as inputs; a timing control unit 14 which receives a correction video signal 33 as an input and which generates a display control signal 15 from the correction video signal based on horizontal/vertical synchronization signals of a display screen; and an optical-system device 200 which displays the video.

Figure 14:
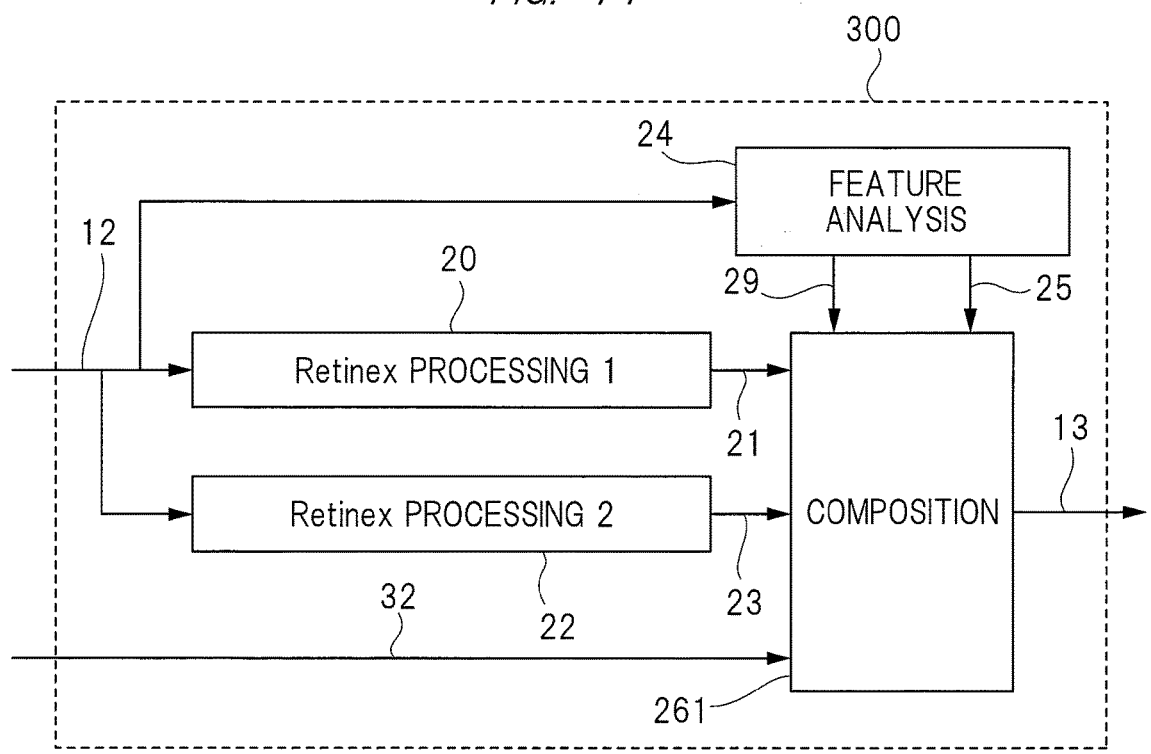
FIG. 14 is an example of a configuration of a video correcting unit.

Next, FIG. 14 illustrates a configuration example of the video correcting unit 300. A video composing unit 261 adaptively composes the first correction video signal 21 and the second correction video signal 23 by the first video composing control signal 29, the second video composing control signal 25, and the illuminance level signal 32, and outputs the composite signal as the correction video signal 13.

Figure 15:
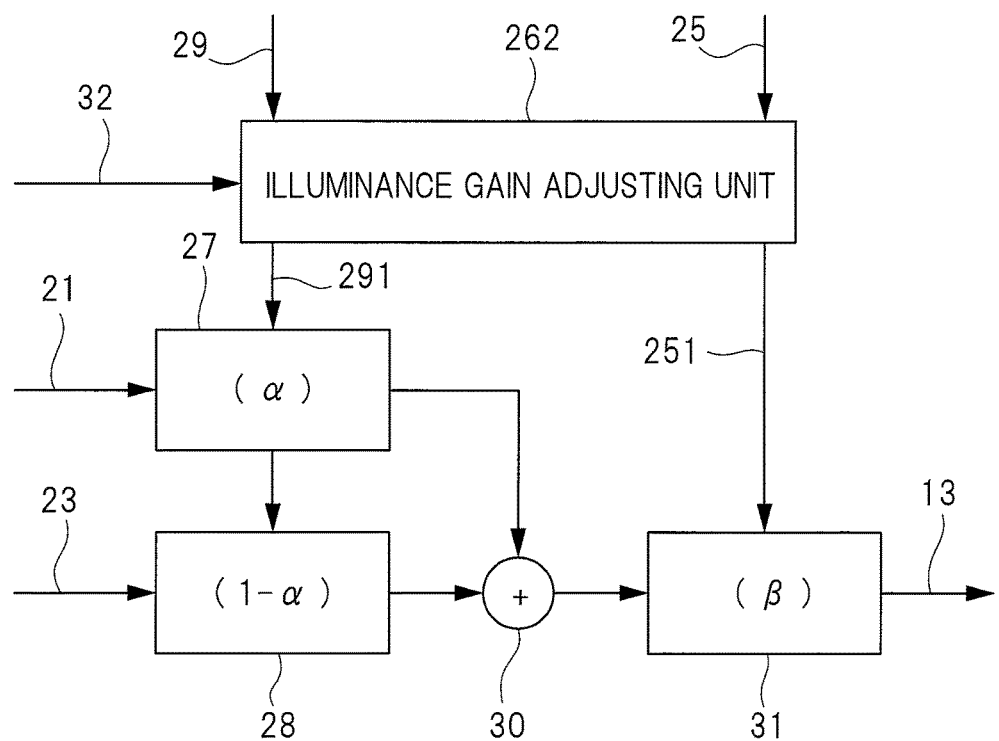
FIG. 15 is an example of a configuration of a video composing unit.

Here, FIG. 15 illustrates an example of a configuration of the video composing unit 261. In an illuminance gain adjusting unit 262, the first video composing control signal 29 and the second video composing control signal 25 are adjusted by the illuminance level signal 32. Next, they are outputted as a second illuminance correction signal 251 and a first illuminance correction signal 291, respectively, and then, are added to the gain control units 27, 28, and 31 as illustrated in FIG. 15. In this manner, a composition property of the correction video signal 13 is determined.

In the above configuration, first, for example, when the illuminance is high, the first video composing control signal 29 is corrected in accordance with the illuminance level signal 32 so that the composition ratio of the Retinex processing unit having a small scale size is increased, so that the first illuminance correction signal 291 is outputted. That is, in the configuration example described in the second embodiment, an offset may be added in such a direction as increasing the value α illustrated in FIG. 6.

Figure 16:
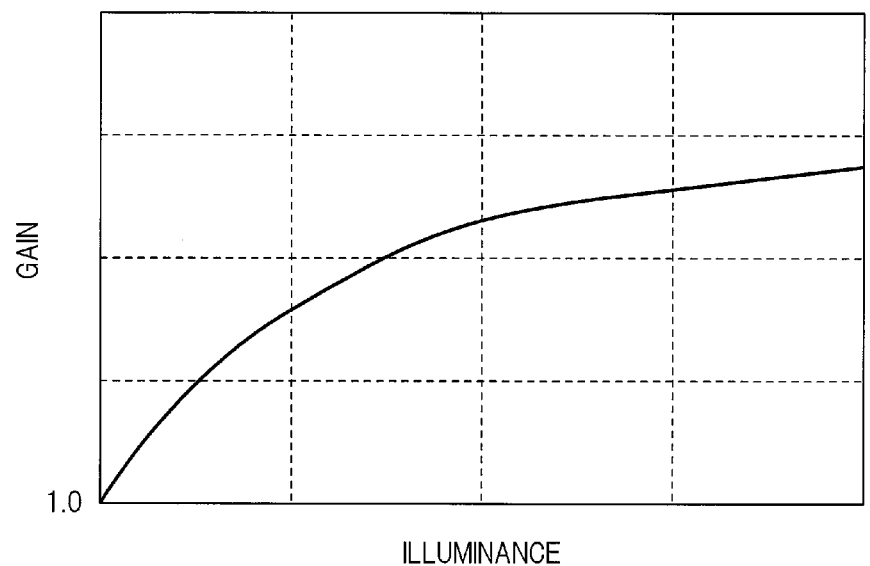
FIG. 16 is a diagram illustrating an example of a control property based on illuminance.

Next, the second video composing control signal 25 is multiplied with, for example, a gain control signal illustrated in FIG. 16 in accordance with the size of the illuminance level signal 32 so as to be the second illuminance correction signal 251. In this manner, when an ambient illuminance is low, the gain control value β becomes small and a correction amount of the video becomes small, and therefore, a video close to an original video can be reproduced. When the illuminance is high, the gain control value becomes large and the correction amount of the video becomes large, and therefore, the visibility of the video under a bright environment can be improved. The method of correction is not limited to this, and, for example, the offset may be added to the second video composing control signal 25 in accordance with the illuminance level signal 32 for the correction. That is, the correction amount under the bright environment may be controlled to be increased in accordance with the illuminance level.

According to the fourth embodiment of the present invention described above, by the control of the video processing in consideration of an influence of the external light, the visibility of the video can be improved even under the bright environment.

Fifth Embodiment

Figure 17:
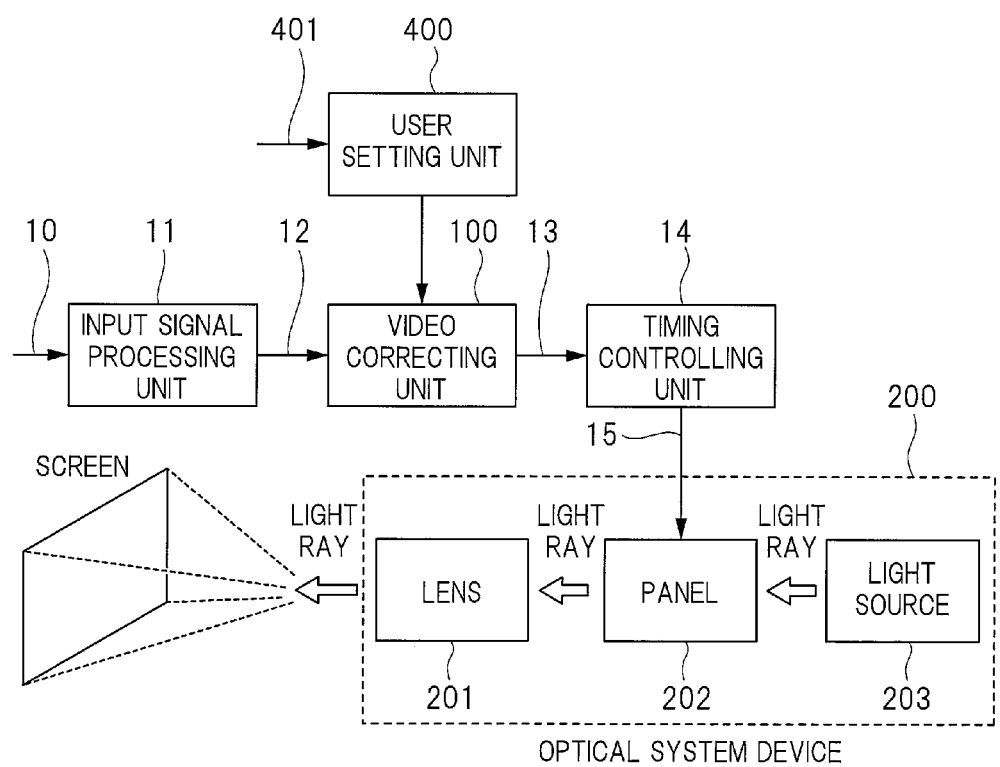
FIG. 17 is an example of a configuration diagram of a video display device according to a fifth embodiment of the present invention.

In this embodiment, in the video display device of the present invention, an example of a control method when a user sets a correction property will be described. FIG. 17 illustrates an example of a configuration of the present embodiment in which a user setting unit 400 is provided. The user setting unit 400 is configured so that the user can set whether to perform the correction and set the amount of the correction in the video processing in the video display device by receiving an operation signal 401 from the user as an input through an operation of an operation button of a remote controller or a device body and outputting an operation command signal to the video correcting unit 100 in accordance with the operation signal. In this manner, the user can perform such setting as switching the video displayed in a display unit to a user's desired state.

Note that the example of FIG. 17 has the configuration provided with the user setting unit 400 in the configuration example of the video display device of FIG. 1. However, the configuration is not limited thereto, and the user setting unit 400 may be provided in the configuration example of the video display device having the illuminance sensor illustrated in FIG. 13. That is, the present embodiment may be applied to any embodiment described above.

Figure 18:
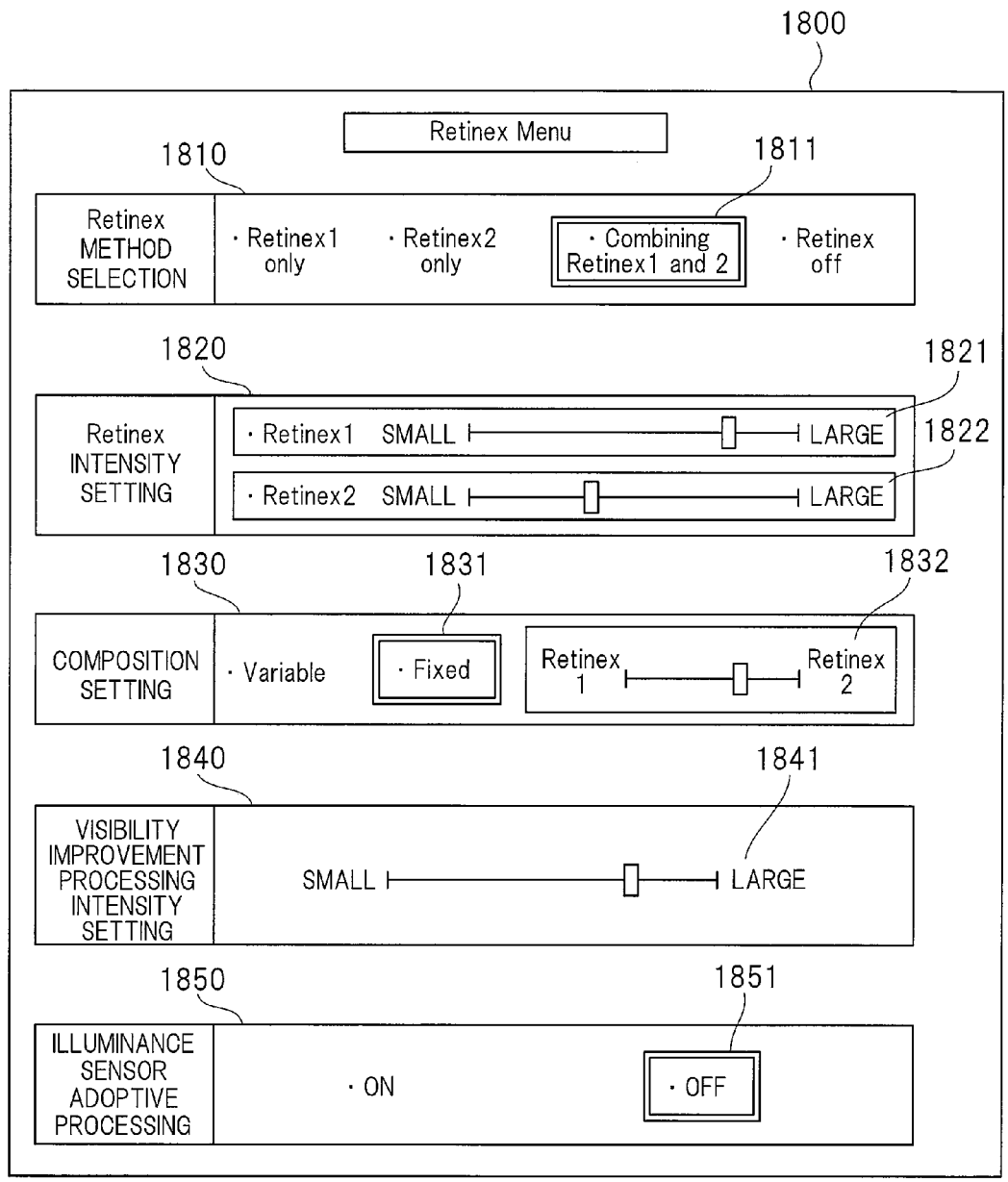
FIG. 18 is an example of a setting menu screen according to a fifth embodiment of the present invention.

In FIG. 18, an example of setting items which can be set by the user setting unit of the present embodiment will be described by using a setting menu screen 1800 which the video display device displays.

The setting menu screen 1800 has a signal generated by a menu screen signal generating unit (whose illustration is omitted) in the video display device, and outputs the signal instead of the correction video signal 13. Alternatively, the setting menu screen 1800 has a signal obtained by convolution with the correction video signal 13, and outputs the signal.

The item "Retinex Method Selection" 1810 in an example of the setting menu screen 1800 will be described. With the item "Retinex Method Selection" 1810, it can be selected whether to use the Retinex processing of both of the first Retinex processing unit 20 and the second Retinex processing unit 22 described in each embodiment. The selection process is performed by moving a cursor 1811 through the operation of the operation button of the remote controller or the device body. The selected item and the process in this case will be described. For example, when an item "Retinex 1 only" is selected, only the process of the first Retinex processing unit 20 is applied to the process of the video correcting unit, and the process of the second Retinex processing unit 22 is not applied to the process of the video correcting unit. Specifically, the composition control value α may be set to 1, or the operation of the second Retinex processing unit 22 may be turned off. Next, on the contrary, when the item "Retinex 2 only" is selected, only the process of the second Retinex processing unit 22 is applied to the process of the video correcting unit, and the process of the first Retinex processing unit 20 is not applied to the video correcting unit. Specifically, the composition control value α may be set to 0, and the operation of the first Retinex processing unit 20 may be turned off. When the selection item "Combining Retinex 1 and 2" is selected, the processes of the first Retinex processing unit 20 and the process of the second Retinex processing unit 22 are composed and outputted as described above in the embodiment. When the selection item "Retinex OFF" is selected, both of the process of the first Retinex processing unit 20 and the process of the second Retinex processing unit 22 are not applied to the process of the video correcting unit. The operation of both processes may be turned off, and the video inputted to the video correcting unit may be outputted while bypassing the video correcting unit.

In the item "Retinex Method Selection" 1810 described above, it is not always required to show the above-described four selection items to the user. For example, only two selection items "Combining Retinex 1 and 2" and "Retinex OFF" may be shown. In addition, three selection items "Combining Retinex 1 and 2", "Retinex 1 only", and "Retinex OFF" may be shown. That is, at least two items among the exemplified items may be shown.

Next, the item "Retinex Intensity Setting" 1820 of the example of the setting menu screen 1800 will be descried. In the item "Retinex Intensity Setting" 1820, an intensity of each Retinex processing can be set. Specifically, the intensity of each Retinex processing is set by moving slide bars 1821 and 1822 through the operation of the operation button of the remote controller or the device body. The process in this case can be achieved by, for example, adding an offset to the gain of each Retinex processing illustrated in FIGS. 4A and 4B in accordance with the intensity. For example, a positive offset is added to the gain of FIGS. 4A and 4B when the intensity is high, and a negative offset is added when the intensity is low. Such a process of adding the offset can be achieved by inserting the process of adding the offset into the first Retinex processing unit 20 and the second Retinex processing unit 22, or inserting it to the correction video signal 21 and the correction video signal 23.

Note that the item "Retinex Intensity Setting" 1820 may be configured to switch an active state and an inactive state in accordance with the selection status of the item "Retinex Method Selection" 1810. That is, the slide bar for a process turned off in the item "Retinex Method Selection" 1810 may be the inactive state.

Next, the item "Composition Setting" 1830 of the example of the setting menu screen 1800 will be described. In the item "Composition Setting" 1830, the composition ratio of each Retinex processing can be set. This operation is achieved by controlling the value α described in each embodiment described above. Specifically, first, the user can select either one of "Variable" and "Fixed" by moving a cursor 1831 through the operation of the operation button of the remote controller or the device body. When "Variable" is selected, the composition control value α can be changed in accordance with the input video signal as described in each embodiment described above. When "Fixed" is selected, the composition control value α is not changed in accordance with the input video signal, but fixed to the state selected by the user. Specifically, the user adjusts a slide bar 1832 through the operation of the operation button of the remote controller or the device body, and the setting is made in the state fixed to the composition control value α corresponding to the position. In the example of FIG. 18, the value α is increased as the bar moves toward the left, and the composition is made by putting a priority on the process of the first Retinex processing unit 20. The value α is decreased as the bar moves toward the right, and the composition is made by putting a priority on the process of the second Retinex processing unit 22.

Note that the item "Composition Setting" 1830 may be configured to switch the active state and the inactive state in accordance with the selection status of the item "Retinex Method Selection" 1810. That is, when the item "Combining Retinex 1 and 2" is not selected, the item "Composition Setting" 1830 may be entirely set to the inactive state.

Next, the item "Visibility Improvement Intensity Setting" 1840 of the example of the setting menu screen 1800 will be described. By using the item, a magnitude of the effect of the process of the gain control unit 31 of FIG. 3 can be set. Specifically, a magnitude of the amplitude of a change amount of the gain control value β is changed in accordance with the movement of a slide bar 1841. In all the properties of FIGS. 5B, 5D, and 5F, the visibility improvement process is enhanced more as the amplitude of the change amount of the gain control value β is larger.

Next, the item "Illuminance Sensor Adaptive Process" 1850 of the example of the setting menu screen 1800 will be described. The item is a menu item used when the user setting unit 400 is provided to the configuration example of the video display device having the illuminance sensor illustrated in FIG. 13 of the fourth embodiment. In the item "Illuminance Sensor Adaptive Process" 1850, the user can select either "ON" or "OFF" by moving a cursor 1851 through the operation of the operation button of the remote controller or the device body. When "OFF" is selected, the gain control value of FIG. 16 described in the fourth embodiment is fixed to 1.

According to the video display device on which the user setting unit 400 described in the fifth embodiment of the above-described present invention is mounted, the user can adjust the video correction process in each embodiment of the present invention in accordance with a user's preference, a usage purpose or a usage environment of the video display device. In this manner, a more convenient video display device can be provided.

REFERENCE SIGNS LIST

10 video input signal
12 internal video signal
13 correction video signal
15 display control signal
20 first Retinex processing unit
21 first correction video signal
22 second Retinex processing unit
23 second correction video signal
24 feature analyzing unit
25 video composing control signal
26 video composing unit
27, 28, 31 gain control unit
29 video composing control signal
30 adder
32 illuminance level signal
33 correction video signal of adaptive control
100 video correcting unit
101 reflected light component based on scale 1
102 reflected light component based on scale 2
120 reflected light detecting unit based on MSR
122 result of convolution product based on scale 1 filter
124 result of convolution product based on scale 2 filter
126 result value of SSR based on scale 1
128 result value of SSR based on scale 2
130 reflected light control unit based on MSR
131 result value of weighted averaging of result of each SSR (including gain)
152 result of convolution product based on specular filter
154 result of convolution product based on diffusing filter
156 result of convolution product based on ambient filter
158 result of function conversion of specular filter
160 result of function conversion of diffusing filter
162 result of function conversion of ambient filter
181 result value of weighted averaging of specular component and diffusing component (including gain)
302 edge signal

The invention claimed is:

1. A video display device comprising:
a video input unit;
a first Retinex processing unit which performs a first Retinex process on a video input from the video input unit;
a second Retinex processing unit which performs a second Retinex process, which is different from the first Retinex process, on the video input from the video input unit;
a video composing unit which composes a video processed by the first Retinex processing unit and a video processed by the second Retinex processing unit in accordance with a feature of the video input from the video input unit; and
a display unit which displays the composed video composed by the video composing unit,
wherein the display unit displays a setting menu screen, and
wherein, on the setting menu screen, a setting item is displayed to switch a video display state of the display unit among at least two display states of:
a first state in which a video subjected to the first Retinex process and a video subjected to the second Retinex process are subjected to video composition is displayed,
a second state in which a video subjected not to the second Retinex process, but the subject to the first Retinex process is displayed,
a third state in which a video subjected not to the first Retinex process, but subject to the second Retinex process is displayed, and
a fourth state in which a video subjected to neither the first Retinex process nor the second Retinex process is displayed.

2. The video display device according to claim 1, wherein, a setting item for changing a composition ratio in the video composition of the video subjected to the first Retinex process and the video subjected to the second Retinex process is displayed on the setting menu screen.

3. The video display device according to claim 1, further comprising:
an illuminance sensor which measures an illuminance of an external light,
wherein a process of the video composing unit is changed in accordance with a measurement result of the illuminance sensor.

4. A video display device comprising:
a video input unit;
a first Retinex processing unit which performs a first Retinex process on a video input from the video input unit;
a second Retinex processing unit which performs a second Retinex process, which is different from the first Retinex process, on the video input from the video input unit;
a video composing unit which composes a video processed by the first Retinex processing unit and a video processed by the second Retinex processing unit in accordance with a feature of the video input from the video input unit; and
a display unit which displays the composed video composed by the video composing unit,
wherein a scale in the first Retinex process and a scale in the second Retinex process are different from each other, and
wherein the video composing unit changes a composition ratio between the video subjected to the first Retinex process and the video subjected to the second Retinex process in accordance with luminance information or frequency information of the video input from the video input unit.

5. The video display device according to claim 4, further comprising:
an illuminance sensor which measures an illuminance of an external light,
wherein a process of the video composing unit is changed in accordance with a measurement result of the illuminance sensor.

6. A video display device comprising:
a video input unit;
a first Retinex processing unit which performs a first Retinex process on a video input from the video input unit;
a second Retinex processing unit which performs a second Retinex process, which is different from the first Retinex process, on the video input from the video input unit;
a video composing unit which composes a video processed by the first Retinex processing unit and a video processed by the second Retinex processing unit in accordance with a feature of the video input from the video input unit; and
a display unit which displays a composed video composed by the video composing unit,
wherein the first Retinex process is a process which separates an input video into a plurality of reflected light components, which adjusts each of the plurality of separated reflected light components by a weight value, which performs a weighted average, and which controls a ratio of a reflected light in the video, and
wherein the second Retinex process is a Retinex process having a larger scale than a scale of the first Retinex process.

7. The video display device according to claim 6,
wherein the display unit displays a setting menu screen, and
wherein, on the setting menu screen, a setting item is displayed to switch a video display state of the display unit among at least two display states of:
a first state in which a video subjected to the first Retinex process and a video subjected to the second Retinex process are subjected to video composition is displayed,
a second state in which a video subjected not to the second Retinex process, but the first Retinex process is displayed,
a third state in which a video subjected not to the first Retinex process, but the second Retinex process is displayed, and
a fourth state in which a video subjected to neither the first Retinex process nor the second Retinex process is displayed.

8. The video display device according to claim 7,
wherein a setting item for changing a composition ratio in the video composition of the video subjected to the first Retinex process and the video subjected to the second Retinex process is displayed on the setting menu screen.

9. The video display device according to claim 7, further comprising:
an illuminance sensor which measures an illuminance of an external light,
wherein a process of the video composing unit is changed in accordance with a measurement result of the illuminance sensor.

10. The video display device according to claim 6,
wherein a scale in the first Retinex process and a scale in the second Retinex process are different from each other,
and wherein the video composing unit changes a composition ratio between the video subjected to the first Retinex process and the video subjected to the second Retinex process in accordance with luminance information or frequency information of the video input from the video input unit.

11. The video display device according to claim 10, further comprising:
an illuminance sensor which measures an illuminance of an external light,
wherein a process of the video composing unit is changed in accordance with a measurement result of the illuminance sensor.

12. The video display device according to claim 6, further comprising:
an illuminance sensor which measures an illuminance of an external light,
wherein a process of the video composing unit is changed in accordance with a measurement result of the illuminance sensor.

13. A projector comprising:
a video input unit;
a first Retinex processing unit which performs a first Retinex process on a video input from the video input unit;
a second Retinex processing unit which performs a second Retinex process, which is different from the first Retinex process, on the video input from the video input unit;
a video composing unit which composes a video processed by the first Retinex processing unit and a video processed by the second Retinex processing unit in accordance with a feature of the video input from the video input unit; and an optical-system device which displays a composed video composed by the video composing unit, as projection video, wherein the optical-system device displays a setting menu screen, and wherein, on the setting menu screen, a setting item is displayed to switch a video display state of the optical-system device among at least two display states of:

a first state in which a video subjected to the first Retinex process and a video subjected to the second Retinex process are subjected to video composition is displayed, a second state in which a video subjected not to the second Retinex process, but the subject to the first Retinex process is displayed, a third state in which a video subjected not to the first Retinex process, but subject to the second Retinex process is displayed, and a fourth state in which a video subjected to neither the first Retinex process nor the second Retinex process is displayed.

14. The projector according to claim 13,
wherein a setting item for changing a composition ratio in the video composition of the video subjected to the first Retinex process and the video subjected to the second Retinex process is displayed on the setting menu screen.

15. The projector according to claim 13, further comprising:
an illuminance sensor which measures an illuminance of an external light,
wherein a process of the video composing unit is changed in accordance with a measurement result of the illuminance sensor.

16. A projector comprising:
a video input unit;
a first Retinex processing unit which performs a first Retinex process on a video input from the video input unit;
a second Retinex processing unit which performs a second Retinex process, which is different from the first Retinex process, on the video input from the video input unit;
a video composing unit which composes a video processed by the first Retinex processing unit and a video processed by the second Retinex processing unit in accordance with a feature of the video input from the video input unit; and
an optical-system device which displays the composed video composed by the video composing unit, as projection video,
wherein a scale in the first Retinex process and a scale in the second Retinex process are different from each other, and
wherein the video composing unit changes a composition ratio between the video subjected to the first Retinex process and the video subjected to the second Retinex process in accordance with luminance information or frequency information of the video input from the video input unit.

17. The projector according to claim 16, further comprising:
an illuminance sensor which measures an illuminance of an external light,
wherein a process of the video composing unit is changed in accordance with a measurement result of the illuminance sensor.

18. A projector comprising:
a video input unit;
a first Retinex processing unit which performs a first Retinex process on a video input from the video input unit;
a second Retinex processing unit which performs a second Retinex process, which is different from the first Retinex process, on the video input from the video input unit;
a video composing unit which composes a video processed by the first Retinex processing unit and a video processed by the second Retinex processing unit in accordance with a feature of the video input from the video input unit; and
an optical-system device which displays a composed video composed by the video composing unit, as projection video,
wherein the first Retinex process is a process which separates an input video into a plurality of reflected light components, which adjusts each of the plurality of separated reflected light components by a weight value, which performs a weighted average, and which controls a ratio of a reflected light in the video, and
the second Retinex process is a Retinex process having a larger scale than a scale of the first Retinex process.

19. The projector according to claim 18,
wherein the optical-system device displays a setting menu screen, and
wherein, on the setting menu screen, a setting item to switch a video display state of the optical-system device among at least two display states of:
a first state in which a video subjected to the first Retinex process and a video subjected to the second Retinex process are subjected to video composition and is displayed,
a second state in which a video subjected not to the second Retinex process, but the first Retinex process is displayed,
a third state in which a video subjected not to the first Retinex process, but the second Retinex process is displayed, and
a fourth state in which a video subjected to neither the first Retinex process nor the second Retinex process is displayed.

20. The projector according to claim 19,
wherein a setting item for changing a composition ratio in the video composition of the video subjected to the first Retinex process and the video subjected to the second Retinex process is displayed on the setting menu screen.

21. The projector according to claim 19, further comprising:
an illuminance sensor which measures an illuminance of an external light,
wherein a process of the video composing unit is changed in accordance with a measurement result of the illuminance sensor.

22. The projector according to claim 18,
wherein a scale in the first Retinex process and a scale in the second Retinex process are different from each other,
and wherein the video composing unit changes a composition ratio between the video subjected to the first Retinex process and the video subjected to the second Retinex process in accordance with luminance information or frequency information of the video input from the video input unit.

23. The projector according to claim 22, further comprising:
- an illuminance sensor which measures an illuminance of an external light,
- wherein a process of the video composing unit is changed in accordance with a measurement result of the illuminance sensor.

24. The projector according to claim 18, further comprising:
- an illuminance sensor which measures an illuminance of an external light,
- wherein a process of the video composing unit is changed in accordance with a measurement result of the illuminance sensor.

* * * * *